US012521354B2

(12) United States Patent
MohanKumar et al.

(10) Patent No.: US 12,521,354 B2

(45) **Date of Patent: *Jan. 13, 2026**

(54) NANOPARTICLES FOR TARGETED NON-SURGICAL SPAYING AND NEUTERING

(71) Applicant: University of Georgia Research Foundation, Inc., Athens, GA (US)

(72) Inventors: Sheba M. J. MohanKumar, Athens, GA (US); Puliyur S. MohanKumar, Athens, GA (US); Yen-Jun Chuang, Athens, GA (US)

(73) Assignee: University of Georgia Research Foundation, Inc., Athens, GA (US)

(*) Notice: Subject to any disclaimer, the term of this patent is extended or adjusted under 35 U.S.C. 154(b) by 303 days.

This patent is subject to a terminal disclaimer.

(21) Appl. No.: 17/835,739

(22) Filed: Jun. 8, 2022

(65) Prior Publication Data

US 2022/0387336 A1 Dec. 8, 2022

Related U.S. Application Data

(60) Provisional application No. 63/208,385, filed on Jun. 8, 2021.

(51) Int. Cl.
*A61K 9/51* (2006.01)
*A61K 38/16* (2006.01)
(Continued)

(52) U.S. Cl.
CPC .......... *A61K 9/5123* (2013.01); *A61K 38/168* (2013.01); *A61P 15/16* (2018.01); *A61P 15/18* (2018.01)

(58) Field of Classification Search
CPC ..... A61K 9/5123; A61K 38/168; A61P 15/16; A61P 15/18
See application file for complete search history.

(56) References Cited

U.S. PATENT DOCUMENTS

| | | | |
|---|---|---|---|
| 5,378,688 A | 1/1995 | Nett et al. |
| 2009/0239795 A1 | 9/2009 | Ballance et al. |

(Continued)

FOREIGN PATENT DOCUMENTS

| | | |
|---|---|---|
| CN | 107998404 A | 5/2018 |
| CN | 108524935 A | 9/2018 |

(Continued)

OTHER PUBLICATIONS

Qin, Ya-Ting et al., "pH-Responsive Polymer-Stabilized ZIF-8 Nanocomposites for Fluorescence and Magnetic Resonance Dual-Modal Imaging-Guided Chemo-/Photodynamic Combinational Cancer Therapy" in ACS Applied Materials and Interfaces, 2019, 11, 34268-34281. (Year: 2019).*

(Continued)

*Primary Examiner* — Blessing M Fubara
(74) *Attorney, Agent, or Firm* — Pabst Patent Group LLP

(57) ABSTRACT

Nanoparticles and formulations for non-surgical sterilization are disclosed herein. The nanoparticles for non-surgical sterilization contains a cage, such as a zeolitic imidazolate framework ("ZIF"), a surface modifying agent, a targeting ligand, and an active agent. The surface modifying agent is attached to the outer surface of the cage and the targeting ligand is exposed to the surrounding environment. The active agent is encapsulated in the cage. The targeting ligand binds to a reproductive hormone or a receptor of a reproductive hormone. The active agents can be a ribosome inactivating protein, an apoptosis inducer, a hormone, a receptor ligand, or a nucleic acid, or a combination thereof, that inactivates the ovaries or testes. Uses for the nanoparticles and formulations incorporating the nanoparticles for sterilizing a subject in need thereof are also disclosed.

18 Claims, 8 Drawing Sheets

(51) Int. Cl.
*A61P 15/16* (2006.01)
*A61P 15/18* (2006.01)

(56) References Cited

U.S. PATENT DOCUMENTS

| | | | |
|---|---|---|---|
| 2015/0359900 A1* | 12/2015 | Wang | A61K 31/337 530/331 |
| 2019/0270822 A1 | 9/2019 | Ayres et al. | |
| 2022/0177494 A1 | 6/2022 | Gong et al. | |
| 2022/0387334 A1 | 12/2022 | MohanKumar et al. | |
| 2022/0387335 A1 | 12/2022 | MohanKumar et al. | |

FOREIGN PATENT DOCUMENTS

| | | | | |
|---|---|---|---|---|
| WO | WO-2018187478 A1 * | 10/2018 | | A61K 31/52 |
| WO | 2021097194 A1 | 5/2021 | | |
| WO | 2021103232 A1 | 6/2021 | | |

OTHER PUBLICATIONS

Kalyanaraman et al., "Doxorubicin-induced apoptosis: Implications in cardiotoxicity" in Molecular and Cellular Biochemistry 234/235: 119-124, 2002. (Year: 2002).*

International Search Report received for PCT Patent Application No. PCT/US2022/032645, mailed on Dec. 2, 2022, 5 pages.

International Search Report received for PCT Patent Application No. PCT/US2022/032652, mailed on Sep. 19, 2022, 5 pages.

International Search Report received for PCT Patent Application No. PCT/US2022/032683, mailed on Sep. 23, 2022, 5 pages.

Bellina, et al., "Regioselective Functionalization of the Imidazole Ring via Transition Metal-Catalyzed C—N and C—C Bond Forming Reactions", Advanced Synthesis & Catalysis, vol. 352, No. 8, Sep. 2010, pp. 1223-1276.

Chen, et al., "Derivative of Epigallocatechin-3-gallatea Encapsulated in ZIF-8 with Polyethylene Glycol-Folic Acid Modification for Target and pH-Responsive Drug Release in Anticancer Research", ACS Biomater. Sci. Eng, vol. 4, No. 12, Dec. 10, 2018, pp. 4183-4192.

Jian, et al., "Water-based synthesis of zeolitic imidazolate framework-8 with high morphology level at room temperature", RSC Advances. vol. 5, No. 60, 2015, pp. 48433-48441.

Kuroda, et al., "Saporin toxin-conjugated monoclonal antibody targeting prostate-specific membrane antigen has potent anticancer activity", Prostate, vol. 70, No. 12, Jul. 8, 2010, pp. 1286-1294.

Labrie, et al., "Gonadotropin-releasing hormone agonists in the treatment of prostate cancer", Endocr Rev, vol. 26 No.3, May 2, 2005., pp. 361-379.

Lu, et al., "A Review on Polymer and Lipid-Based Nanocarriers and Its Application to Nano-Pharmaceutical and Food-Based Systems", Front Nutr., vol. 8, No. 783831, Dec. 1, 2021, 13 pages.

Mitchell, et al., "Engineering precision nanoparticles for drug delivery", Nat Rev Drug Discov., vol. 20, No. 2, Feb. 2021, pp. 101-124.

Myers, et al., "Methods for quantifying follicular numbers within the mouse ovary", Reproduction, vol. 127, No. 5, May 2004, pp. 569-580.

Qin, et al., "pH-Responsive Polymer-Stabilized ZIF-8 Nanocomposites for Fluorescence and Magnetic Resonance Dual-Modal Imaging-Guided Chemo-/Photodynamic Combinational Cancer Therapy", ACS Appl Mater Interfaces., vol. 11, No. 37, Sep. 18, 2019, pp. 34268-34281.

Shieh, et al., "Water-Based Synthesis of Zeolitic Imidazolate Framework-90 (ZIF-90) with a Controllable Particle Size", Chemistry, vol. 19, No. 34, Aug. 19, 2013, pp. 11139-11142.

Vallet-Regí, et al., "Mesoporous Silica Nanoparticles for Drug Delivery: Current Insights", Molecules, vol. 23, No. 47, Jan. 2018, 19 pages.

Wang, et al., "State of the Art and Prospects in Metal-Organic Framework (MOF)-Based and MOF-Derived Nanocatalysis", Chem Rev., vol. 120, No. 2, Jan. 22, 2020, pp. 1438-1511.

* cited by examiner

NANOPARTICLES FOR TARGETED NON-SURGICAL SPAYING AND NEUTERING

CROSS-REFERENCE TO RELATED APPLICATION

This application claims benefit of and priority to U.S. Provisional Application No. 63/208,385 filed Jun. 8, 2021, which is incorporated herein by reference in its entirety.

FIELD OF THE INVENTION

This invention is generally in the field of compositions for spaying and neutering.

BACKGROUND OF THE INVENTION

Spaying and neutering are important interventions that are used in both livestock and pet animals to provide a wide range of benefits. In pet animals, spaying and neutering prevents undesirable behavior, controls the spread of parasitic infections and zoonotic diseases such as rabies, increases life span and prevents pet overpopulation. In livestock, spaying and neutering reduces aggression, promotes safe handling of animals and reduces injury and undesirable meat quality.

Surgical spaying and neutering are widely used in the pet and livestock industries. Approximately 15 million male calves destined for beef production are castrated annually. Physical methods, such as use of a scalpel, Burdizzo castrator, banders, or an elastrator band are frequently used. However, these are associated with a risk of hemorrhage and tetanus.

Chemical methods involve implanting deslorelin (e.g. Suprelorin®, Virbac, etc.) subcutaneously in male dogs or cats. While this implant can suppress testicular function for extended periods of time (6-12 months), once the effect of the implant wears off, the testes resume their original size, and the animal becomes fertile once again.

There remains a need for improved materials and methods for non-surgical spaying and neutering.

Therefore, it is the object of the present invention to provide compositions for non-surgical spaying and neutering of animals.

It is a further object of the present invention to provide pharmaceutical formulations for non-surgical spaying and neutering of animals.

It is a further object of the present invention to provide methods for non-surgical spaying and neutering of animals.

SUMMARY OF THE INVENTION

Nanoparticles and formulations for non-surgical sterilization are disclosed herein. Also disclosed are uses for the nanoparticles and formulations incorporating the nanoparticles.

The nanoparticles for non-surgical sterilization contains a cage, such as a zeolitic imidazolate framework ("ZIF"), a surface modifying agent, a targeting ligand, and an active agent. The cage is a 3-dimentional structure that contains an opening for encapsulating a substance therein. Suitable materials for forming the cage of the nanoparticles include ZIF and other metal-organic frameworks, such as organic-inorganic hybrid crystalline porous materials and those described in Wang, et al., Chem. Rev. 120(2):1438-1511 (2020); lipids, such as phospholipids, sterols, sphingolipids, PEGylated lipids, glycerolipids, anionic lipids, and cationic lipids, e.g. those described in Lu, et al., Frontiers in Nutrition, 8:783831 (2021) and Mitchell, et al., Nature Reviews, 20:101 (2021); polymers, such as polymersomes, dendrimers, polymeric micelles, and nanospheres, e.g. those described in Lu, et al., Frontiers in Nutrition, 8:783831 (2021) and Mitchell, et al., Nature Reviews, 20:101 (2021); and inorganic materials, such as silica, e.g. mesoporous silica and those described in Vallet-Regi, et al., Molecules, 23(47):23010047 (2018). Typically, the surface modifying agent is attached to the outer surface of the cage and the targeting ligand is exposed to the surrounding environment. The active agent is encapsulated in the cage. For example, the surface modifying ligand is attached to the outer surface of the ZIF and the targeting ligand is exposed to the surrounding environment. The active agent is encapsulated in the ZIF.

When the cage of the nanoparticles is a ZIF, the ZIF contains a metal ion and an imidazolate linker. The imidazolate linker may be un-modified or functionalized with amine, hydroxyl, thiol, aldehyde, or carboxyl, or a combination thereof.

Optionally, the targeting ligand is conjugated to the surface modifying agent. At least 20 wt % (weight of the surface modifying agent conjugated to the targeting ligand/total weight of the surface modifying agent attached to the cage) of the surface modifying agent is conjugated to the targeting ligand. For example, at least 20 wt % (weight of the surface modifying agent conjugated to the targeting ligand/total weight of the surface modifying agent attached to the ZIF) of the surface modifying agent is conjugated to the targeting ligand.

The surface modifying agent contains a polymer backbone, such as a polyalkylene glycol backbone (e.g. polyethylene glycol backbone) or a poly(lactic-co-glycolic acid) backbone. The surface modifying agent can ionically bind to the outer surface of the cage through a charged chemical moiety that is conjugated to one end of the surface modifying agent, such as folate, L-methylfolate, or glutamate, or a combination thereof. For example, the surface modifying agent is ionically bound to the outer surface of the ZIF through a charged chemical moiety that is conjugated to one end of the surface modifying agent, such as folate, L-methylfolate, or glutamate, or a combination thereof.

The nanoparticles generally have an average diameter (including the surface modifying agent) of less than 100 nm and a surface density of the surface modifying agent ("SMA") of at least 1 SMA/$nm^2$.

Typically, the targeting ligand binds to a reproductive hormone or a receptor of a reproductive hormone, such as a gonadotropin-releasing hormone ("GnRH") agonist, a follicle stimulating hormone ("FSH") receptor agonist, or a combination thereof.

The description below describes nanoparticles that contain a ZIF cage. However, these descriptions apply to other suitable materials for forming the cage, as well, such as those described above. Thus references to a "ZIF" or "ZIF cage" herein also generally apply to other suitable materials for forming a cage of the nanoparticles.

The active agent encapsulated in the ZIF can be a substance that can inactivate ribosomes of gonadotroph cells, induce apoptosis of gonadotroph cells, reduce or prevent secretion of luteinizing hormone and/or follicle stimulating hormone, and/or inhibit development of ovarian follicles or reduce or prevent sperm production, and thereby inactivate ovaries or testes, such as a ribosome inactivating protein, a hormone, an apoptosis inducer, a receptor ligand, or a nucleic acid, or a combination thereof. Optionally, the nanoparticles further include a diagnostic agent encapsulated in the ZIF, such as a fluorescent molecule.

Pharmaceutical formulations containing a plurality of the nanoparticles described herein and a pharmaceutically acceptable carrier and/or excipient are disclosed. The pharmaceutical formulations can be in a suitable form for oral administration, intramuscular administration, intravenous administration, intraperitoneal administration, or subcutaneous administration, or a combination thereof. In some embodiments, the nanoparticles are included in the pharmaceutical formulation in an effective amount to decrease the level of a gonadal hormone (e.g., estrogen and/or testosterone) in the blood of a subject. In some embodiments, the nanoparticles are included in the pharmaceutical formulation in an effective amount to decrease the estrogen level in the blood, and/or induce the degeneration of ovarian follicles, and/or terminate the estrous cycle of a subject. In some embodiments, the nanoparticles are included in the pharmaceutical formulation in an effective amount to decrease the testosterone level in the blood and/or induce the degeneration of seminiferous tubules in a subject.

For example, the amount of the nanoparticles in the pharmaceutical formulation is effective to degenerate ovarian follicles of the subject by at least 80%, at least 85%, at least 90%, at least 95%, or up to 100% as shown by imaging compared to ovarian follicles of a control subject at the same stage of estrous cycle and/or to terminate estrous cycle of the subject as shown by a state of constant estrous stage. For example, the amount of the nanoparticles in the pharmaceutical formulation is effective to degenerate seminiferous tubules of the subject by at least 80%, at least 85%, at least 90%, at least 95%, or up to 100% as shown by imaging compared to seminiferous tubules of a control subject.

Methods for sterilizing a subject in need thereof using the formulations described herein are also disclosed. The method includes administering to the subject the pharmaceutical formulation, where the pharmaceutical formulation contains an effective amount of the nanoparticles to induce the degeneration of ovarian follicles and/or terminate the estrous cycle in the subject. The subject is a mammal.

BRIEF DESCRIPTION OF THE DRAWINGS

FIG. 3A shows the fluorescent emission of the nanoparticles excited at 600 nm. FIG. 3B shows the fluorescent emission of the nanoparticles excited at 645 nm.

DETAILED DESCRIPTION OF THE INVENTION

I. Nanoparticles

Figure 1A:
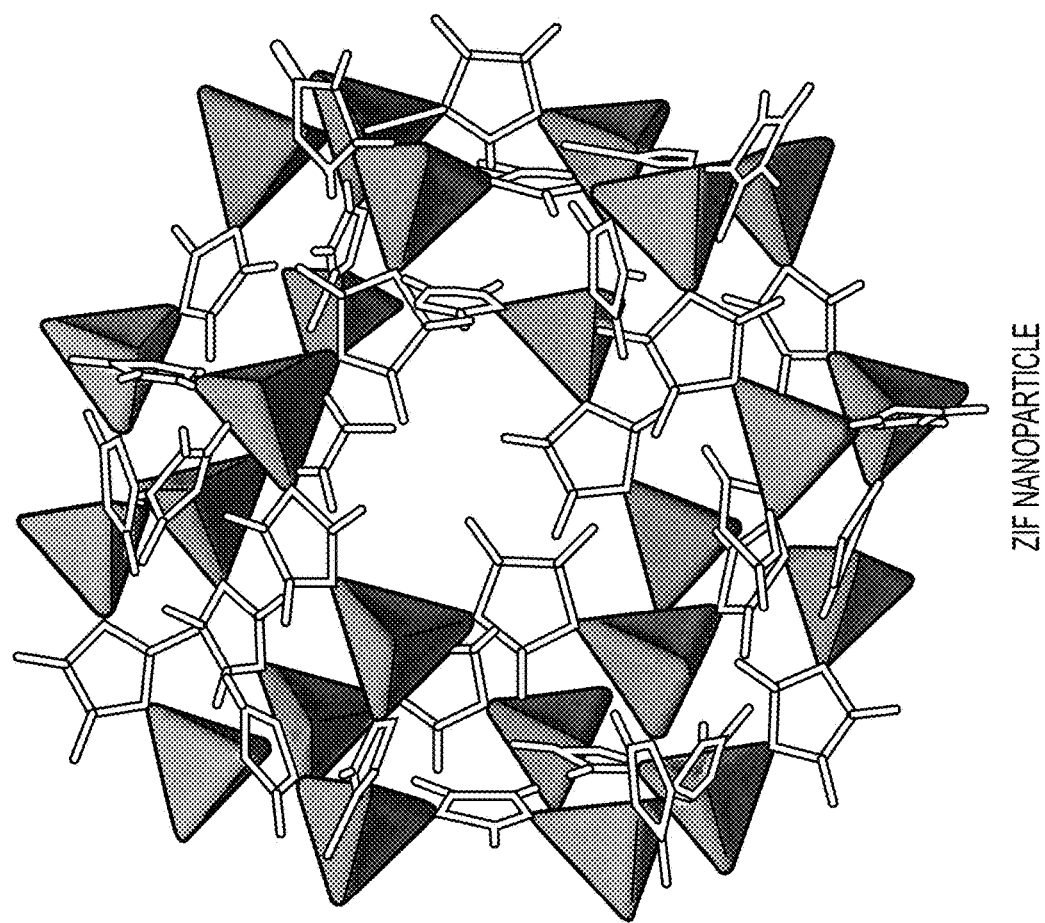
FIG. 1A is a schematic showing the components forming an exemplary nanoparticle.
Figure 1A:
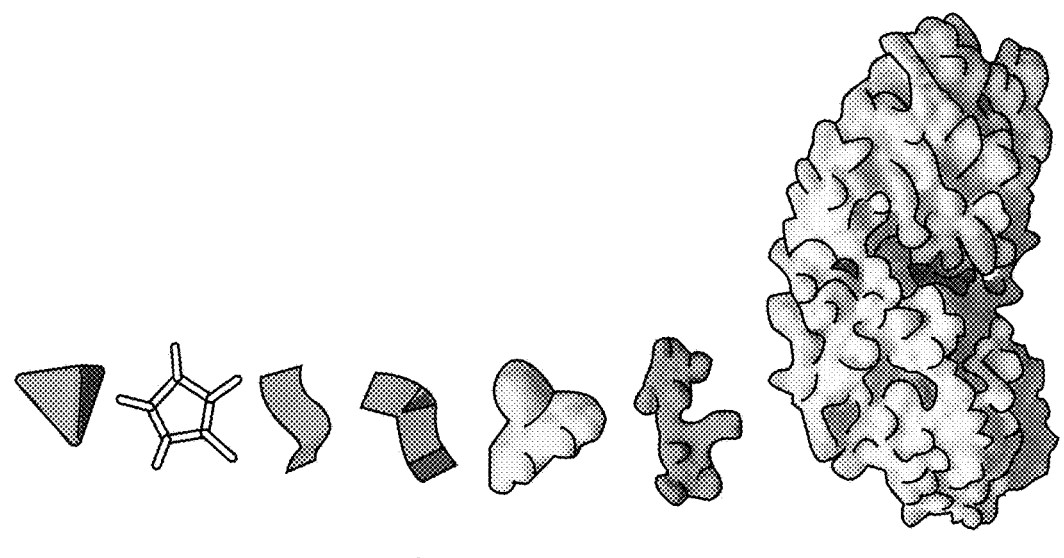

Nanoparticles for non-surgical spaying and neutering are described herein. Generally, the nanoparticles contain a cage, a surface modifying agent, a targeting ligand, and an active agent. For example, the cage forming the nanoparticles is a zeolitic imidazolate framework (also referred herein as "ZIF"). The cage is a 3-dimensional structure that contains an opening for encapsulating a substance therein. Suitable materials for forming the cage of the nanoparticles include ZIF and other metal-organic frameworks, such as organic-inorganic hybrid crystalline porous materials and those described in Wang, et al., Chem. Rev. 120(2):1438-1511 (2020); lipids, such as phospholipids, sterols, sphingolipids, PEGylated lipids, glycerolipids, anionic lipids, and cationic lipids, e.g. those described in Lu, et al., Frontiers in Nutrition, 8:783831 (2021) and Mitchell, et al., Nature Reviews, 20:101 (2021); polymers, such as polymersome, dendrimers, polymeric micelles, and nanospheres, e.g. those described in Lu, et al., Frontiers in Nutrition, 8:783831 (2021) and Mitchell, et al., Nature Reviews, 20:101 (2021); and inorganic materials, such as silica, e.g. mesoporous silica and those described in Vallet-Regi, et al., Molecules, 23(47):23010047 (2018).

The surface modifying ligand can be attached to the outer surface of the cage. Typically, the targeting ligand is arranged on the outer surface of the cage such that it is exposed to the surrounding environment. Optionally, the targeting ligand is conjugated to the surface modifying ligand and is exposed to the surrounding environment. The active agent can be encapsulated in the cage.

For example, the surface modifying agent is attached to the outer surface of the ZIF. The targeting ligand is arranged on the outer surface of the ZIF such that it is exposed to the surrounding environment. Optionally, the targeting ligand is conjugated to the surface modifying agent and is exposed to the surrounding environment. The active agent can be encapsulated in the ZIF.

The nanoparticles can degrade in an acidic environment (i.e. pH≤6.5, such as in a range from about 4.5 to about 5.0) and thereby release the active agent. For example, following oral or intravenous administration of the nanoparticles in a subject, such as a mammal, the nanoparticles remain intact in an environment having physiological pH (i.e. pH >6.5, such as in a range from about 6.5 to about 8.0). After the nanoparticles are engulfed by the cell membrane and enter the cell, they are delivered to the lysosomes which generally maintain an acidic pH, such as from about 4.5 to about 5.0, in which the nanoparticles degrade.

The overall charge of the nanoparticles is generally neutral or near neutral.

A. Components

1. ZIF

The cage of the nanoparticles may be a ZIF. ZIFs are metal-organic frameworks formed by metal ions and imidazolate linkers. Any suitable ZIF may be used in the nanoparticles. Preferably, the ZIFs suitable for use in the nanoparticles are synthesized using water-based preparation conditions to maintain the biological activities of the targeting ligands and the active agents of the nanoparticles. For example, suitable ZIFs and water-based synthesis methods for making ZIFs are described in Jian, et al., *RSC Adv.*, 5:48433 (2015) and Shieh, et al., *Chem. Eur. J.*, 19:11139 (2013).

For example, a ZIF can be formed through three-dimensional assembly of tetrahedrally-coordinated metal-imidazolate building units corresponding to a general Formula (I) below:

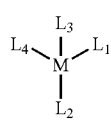

Formula (I)

in which:

M represents a metal ion;

Each of $L_1$, $L_2$, $L_3$, and $L_4$ represents an imidazolate linker; they may be the same or different;

The metal ion binds to each of the imidazolate linkers $L_1$, $L_2$, $L_3$, and $L_4$ via a nitrogen atom of the imidazolate linker.

Each solid line in Formula (I) indicates a coordinate covalent bond.

The ZIF can have any suitable crystal structure, such as ZIF-2, ZIF-3, ZIF-4, ZIF-8, ZIF-10, ZIF-11, ZIF-12, ZIF-14, ZIF-20, ZIF-21, ZIF-60, ZIF-61, ZIF-62, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-81, ZIF-82, ZIF-90, ZIF-91, ZIF-92, ZIF-95, or ZIF-100. For example, the ZIF has a crystal structure of ZIF-90.

a. Metal Ions

The ZIF can include building units as shown in Formula (I), containing a metal ion.

Examples of metal ions contained in a building unit of ZIF include, but are not limited to, $Li^+$, $Na^+$, $K^+$, $Rb^+$, $Cs^+$, $Be^{2+}$, $Mg^{2+}$, $Ca^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, $Mo^{6+}$, $Mo^{5+}$, $Mo^{4+}$, $Mo^{3+}$, $Mo^{2+}$, $Mo^+$, $W^{6+}$, $W^{5+}$, $W^{4+}$, $W^{3+}$, $W^{2+}$, $W^+$, $Mn^{7+}$, $Mn^{6+}$, $Mn^{5+}$, $Mn^{4+}$, $Mn^{3+}$, $Mn^{2+}$, $Mn^+$, $Re^{7+}$, $Re^{6+}$, $Re^{5+}$, $Re^{4+}$, $Re^{3+}$, $Re^{2+}$, $Re^+$, $Fe^{6+}$, $Fe^{4+}$, $Fe^{3+}$, $Fe^{2+}$, $Fe^+$, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^+$, $Os^{2+}$, $Os^+$, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, $Ni^{3+}$, $Ni^{2+}$, $Ni^+$, $Pd^{6+}$, $Pd^{4+}$, $Pd^{2+}$, $Pd^+$, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, $Cd^{2+}$, $Cd^+$, $Hg^{4+}$, $Hg^{2+}$, $Hg^+$, $B^{3+}$, $B^{2+}$, $B^+$, $Al^{3+}$, $Al^{2+}$, $Al^+$, $Ga^{3+}$, $Ga^{2+}$, $Ga^+$, $In^{3+}$, $In^{2+}$, $In^+$, $Tl^{3+}$, $Tl^+$, $Si^{4+}$, $Si^{3+}$, $Si^{2+}$, $Si^+$, $Ge^{4+}$, $Ge^{3+}$, $Ge^{2+}$, $Ge^+$, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $Db^{3+}$, $Db^{2+}$, $Ho^{3+}$, $Er^{3+}$, $Tm^{4+}$, $Tm^{3+}$, $Tm^{2+}$, $Yb^{3+}$, $Yb^{2+}$, $Lu^{3+}$, $La^{3+}$, $La^{2+}$, $La^+$.

Optionally, the metal ion contained in a building unit of ZIF is $Be^{2+}$, $Mg^{2+}$, $Ca^{2+}$, $Sr^{2+}$, $Ba^{2+}$, $Sc^{2+}$, $Y^{3+}$, $Ti^{2+}$, $Zr^{2+}$, $V^{2+}$, $Nb^{2+}$, $Ta^{2+}$, $Cr^{2+}$, $Mo^{2+}$, $W^{2+}$, $Mn^{2+}$, $Re^{2+}$, $Fe^{2+}$, $Ru^{2+}$, $Os^{2+}$, $Co^{2+}$, $Rh^{2+}$, $Ir^{2+}$, $Ni^{2+}$, $Pd^{2+}$, $Pt^{2+}$, $Cu^{2+}$, $Ag^{2+}$, $Au^{2+}$, $Zn^{2+}$, $Cd^{2+}$, $Hg^{2+}$, $B^{2+}$, $Al2+$, $Ga^{2+}$, $In^{2+}$, $Si^{2+}$, $Ge^{2+}$, $Sn^{2+}$, $Pb^{2+}$, $As^{2+}$, $Te^{2+}$, $La^{2+}$, $Ce^{2+}$, $Pr^{2+}$, $Nd^{2+}$, $Sm^{2+}$, $Eu^{2+}$, $Gd^{2+}$, $Tb^{2+}$, $Db^{2+}$, $Tm^{2+}$, or $Yb^{2+}$.

Optionally, the metal ion contained in a building unit of ZIF is $Zn^+$, $Zn^{2+}$, $Pd^{2+}$, $Pd^{4+}$, $Pt^{2+}$, $Pt^{4+}$, $Ni^+$, $Ni^{2+}$, $Ni^{3+}$, $Mn^{2+}$, $Mn^{3+}$, $Mn^4$, $Mn^{6+}$, $Mn^{7+}$, $Co^{2+}$, $Co^{3+}$, $Cu^{2+}$, $Cd^{2+}$, $Fe^{2+}$, $Fe^{3+}$, and $Ti^{4+}$.

The ZIF structure can include building units containing a single type of metal ion as described above, such as $Zn^+$, $Zn^{2+}$, $Pd^{2+}$, $Pd^{4+}$, $Pt^{2+}$, $Pt^{4+}$, $Ni^+$, $Ni^{2+}$, $Ni^{3+}$, $Mn^{2+}$, $Mn^{3+}$, $Mn^{4+}$, $Mn^{6+}$, $Mn^{7+}$, $Co^{2+}$, $Co^{3+}$, $Cu^{2+}$, $Cd^{2+}$, $Fe^{2+}$, $Fe^{3+}$, and $Ti^{4+}$, for example, $Zn^{2+}$.

Optionally, the ZIF structure can include building units containing different metal ions, and is commonly referred to as mixed-metal ZIFs. For example, the ZIF structure includes a first building unit containing a first metal ion, such as $Zn^{2+}$, and a second building unit containing a second metal ion that is different from the first metal ion, such as $Cd^{2+}$, $Co^{2+}$, or $Ni^{2+}$; the assembly of the first and second building units forms the ZIF.

b. Imidazolate Linkers

The ZIF can include building units as shown in Formula (I), containing four imidazolate linkers $L_1$, $L_2$, $L_3$, and $L_4$. In ZIFs formed by the building units of Formula (I), the imidazolate linker coordinates to at least two metal ions. The imidazolate linker is neutral or has an overall negative charge. The imidazolate linkers participate in providing distance between these metal ions, resulting in a three-dimensional network of organic and inorganic components.

The ZIF structure can include building units containing a single type of imidazolate linker. For example, the ZIF structure includes building units of Formula (I), where $L_1$-$L_4$ are the same.

Optionally, the ZIF structure can include a group of building units, where the building units contain one or more different imidazolate linkers. For example, the ZIF structure includes a first building unit containing a first imidazolate linker, and a second building unit containing a second imidazolate linker that is different from the first imidazolate linker; the assembly of the first and second building units forms the ZIF. For example, the ZIF structure includes a first building unit of Formula (I) containing a first imidazolate linker, and a second building unit of Formula (I) containing a second imidazolate linker that is different from the first imidazolate linker; the assembly of the first and second building units forms the ZIF. In each of the first and second building units of Formula (I), $L_1$-$L_4$ are the same.

Optionally, at least one building unit forming the ZIF can contain different imidazolate linkers. For example, the ZIF structure includes at least one building unit that contains a first imidazolate linker and a second imidazolate linker that is different from the first imidazolate linker. For example, the ZIF structure includes at least one building unit of Formula (I), where at least one of $L_1$-$L_4$ is different from the others.

Optionally, the ZIF structure can include building units containing a single type of metal ion and a single type of imidazolate linker.

Optionally, the ZIF structure can include a group of building units containing different metal ions and/or imidazolate linkers. For example, the ZIF structure can include a first building unit containing a first metal ion and an imidazolate linker, and a second building unit containing a second metal ion and the same imidazolate linker, where the second metal ion is different from the first metal ion. For example, the ZIF structure can include a first building unit containing a metal ion and a first imidazolate linker, and a second building unit containing the same metal ion and a second imidazolate linker, where the second imidazolate linker is different from the first imidazolate linker. For example, the ZIF structure can include a first building unit containing a first metal ion and a first imidazolate linker, and a second building unit containing a second metal ion and a second imidazolate linker, where the second metal ion is different from the first metal ion, and the second imidazolate linker is different from the first imidazolate linker.

i. Linker Structures

The imidazolate linker can be an unmodified imidazole compound or a modified imidazole compound. Optionally, each of the imidazolate linker $L_1$, $L_2$, $L_3$, and $L_4$ can be represented by a general Formula (II) shown below:

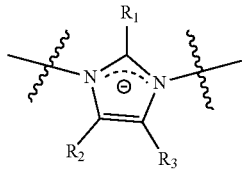

Formula (II)

wherein $R_1$, $R_2$, and $R_3$ are independently hydrogen, a substituted or unsubstituted alkyl, a substituted or unsubstituted alkenyl, a substituted or unsubstituted alkynyl, a substituted or unsubstituted heterocyclyl, a substituted or unsubstituted aryl, a substituted or unsubstituted heteroaryl, a substituted or unsubstituted polyaryl, a substituted or unsubstituted polyheteroaryl, a substituted or unsubstituted aralkyl, a halogen, a hydroxyl, a substituted or unsubstituted alkoxy, an aroxy, a cyano, an isocyano, a nitro, a substituted or unsubstituted carbonyl, an amino, an amido, an azido, or a thiol, or $R_2$ and $R_3$ together form a substituted or unsubstituted cycloalkyl, a substituted or unsubstituted heterocyclyl, a substituted or unsubstituted aryl, or a substituted or unsubstituted heteroaryl;

wherein the substituents can be an unsubstituted alkyl, an unsubstituted alkenyl, an unsubstituted alkynyl, an unsubstituted heterocyclyl, an unsubstituted aryl, an unsubstituted heteroaryl, an unsubstituted polyaryl, an unsubstituted polyheteroaryl, an unsubstituted aralkyl, an unsubstituted carbonyl, an unsubstituted alkoxy, a halogen, a hydroxyl, a phenoxy, an aroxy, a cyano, an isocyano, a nitro, a carboxyl, an amino, an amido, an azido, an oxo, or a thiol, or a combination thereof.

Optionally, $R_1$, $R_2$, and $R_3$ are hydrogen (which is an "unmodified imidazole").

Optionally, $R_1$, $R_2$, and $R_3$ are independently hydrogen, a substituted or unsubstituted alkyl, a substituted or unsubstituted heterocyclyl, a substituted or unsubstituted aryl, a substituted or unsubstituted heteroaryl, a substituted or unsubstituted aralkyl, a halogen, a hydroxyl, a cyano, a nitro, an aldehyde, a carboxyl, an amino, or a thiol, or $R_2$ and $R_3$ together form a substituted or unsubstituted aryl or a substituted or unsubstituted heteroaryl;

wherein the substituents can be a halogen, a hydroxyl, a cyano, a nitro, an aldehyde, a carboxyl, an amino, or a thiol, or a combination thereof.

The term "substituted" refers to moieties having one or more substituents replacing a hydrogen on one or more carbons of the hydrocarbon backbone.

The term "alkyl," as used herein, refers to the radical of saturated aliphatic groups. The alkyl for $R_1$, $R_2$, and $R_3$ of Formula (II) can be a linear alkyl, a branched alkyl, or a cyclic alkyl (either monocyclic or polycyclic; also referred herein as "cycloalkyl"). Exemplary alkyl include a linear $C_1$-$C_{30}$ alkyl, a branched $C_4$-$C_{30}$ alkyl, a cyclic $C_3$-$C_{30}$ alkyl, a linear $C_1$-$C_{20}$ alkyl, a branched $C_4$-$C_{20}$ alkyl, a cyclic $C_3$-$C_{20}$ alkyl, a linear $C_1$-$C_{10}$ alkyl, a branched $C_4$-$C_{10}$ alkyl, a cyclic $C_3$-$C_{10}$ alkyl, a linear $C_1$-$C_6$ alkyl, a branched $C_4$-$C_6$ alkyl, a cyclic $C_3$-$C_6$ alkyl, a linear $C_1$-$C_4$ alkyl, cyclic $C_3$-$C_4$ alkyl, such as a linear $C_1$-$C_{10}$, $C_1$-$C_9$, $C_1$-$C_8$, $C_1$-$C_7$, $C_1$-$C_6$, $C_1$-$C_5$, $C_1$-$C_4$, $C_1$-$C_3$, $C_1$-$C_2$ alkyl group, a branched $C_3$-$C_9$, $C_3$-$C_9$, $C_3$-$C_8$, $C_3$-$C_7$, $C_3$-$C_6$, $C_3$-$C_5$, $C_3$-$C_4$ alkyl group, or a cyclic $C_3$-$C_9$, $C_3$-$C_9$, $C_3$-$C_8$, $C_3$-$C_7$, $C_3$-$C_6$, $C_3$-$C_5$, $C_3$-$C_4$ alkyl group.

The term "alkenyl" as used herein is a hydrocarbon group of from 2 to 24 carbon atoms and structural formula containing at least one carbon-carbon double bond. The alkenyl for $R_1$, $R_2$, and $R_3$ of Formula (II) can be a linear alkenyl, a branched alkenyl, or a cyclic alkenyl (either monocyclic or polycyclic; also referred herein as "cycloalkenyl"). Exemplary alkenyl include a linear $C_1$-$C_{30}$ alkenyl, a branched $C_4$-$C_{30}$ alkenyl, a cyclic $C_3$-$C_{30}$ alkenyl, a linear $C_1$-$C_{20}$ alkenyl, a branched $C_4$-$C_{20}$ alkenyl, a cyclic $C_3$-$C_{20}$ alkenyl, a linear $C_1$-$C_{10}$ alkenyl, a branched $C_4$-$C_{10}$ alkenyl, a cyclic $C_3$-$C_{10}$ alkenyl, a linear $C_1$-$C_6$ alkenyl, a branched $C_4$-$C_6$ alkenyl, a cyclic $C_3$-$C_6$ alkenyl, a linear $C_1$-$C_4$ alkenyl, cyclic $C_3$-$C_4$ alkenyl, such as a linear $C_1$-$C_{10}$, $C_1$-$C_9$, $C_1$-$C_8$, $C_1$-$C_7$, $C_1$-$C_6$, $C_1$-$C_5$, $C_1$-$C_4$, $C_1$-$C_3$, $C_1$-$C_2$ alkenyl group, a branched $C_3$-$C_9$, $C_3$-$C_9$, $C_3$-$C_8$, $C_3$-$C_7$, $C_3$-$C_6$, $C_3$-$C_5$, $C_3$-$C_4$ alkenyl group, or a cyclic $C_3$-$C_9$, $C_3$-$C_9$, $C_3$-$C_8$, $C_3$-$C_7$, $C_3$-$C_6$, $C_3$-$C_5$, $C_3$-$C_4$ alkenyl group.

The term "alkynyl group" as used herein is a hydrocarbon group of 2 to 24 carbon atoms and a structural formula containing at least one carbon-carbon triple bond. The alkynyl for $R_1$, $R_2$, and $R_3$ of Formula (II) can be a linear alkynyl, a branched alkynyl, or a cyclic alkynyl (either monocyclic or polycyclic; also referred herein as "cycloalkynyl"). Exemplary alkynyl include a linear $C_1$-$C_{30}$ alkynyl, a branched $C_4$-$C_{30}$ alkynyl, a cyclic $C_3$-$C_{30}$ alkynyl, a linear $C_1$-$C_{20}$ alkynyl, a branched $C_4$-$C_{20}$ alkynyl, a cyclic $C_3$-$C_{20}$ alkynyl, a linear $C_1$-$C_{10}$ alkynyl, a branched $C_4$-$C_{10}$ alkynyl, a cyclic $C_3$-$C_{10}$ alkynyl, a linear $C_1$-$C_6$ alkynyl, a branched $C_4$-$C_6$ alkynyl, a cyclic $C_3$-$C_6$ alkynyl, a linear $C_1$-$C_4$ alkynyl, cyclic $C_3$-$C_4$ alkynyl, such as a linear $C_1$-$C_{10}$, $C_1$-$C_9$, $C_1$-$C_8$, $C_1$-$C_7$, $C_1$-$C_6$, $C_1$-$C_5$, $C_1$-$C_4$, $C_1$-$C_3$, $C_1$-$C_2$ alkynyl group, a branched $C_3$-$C_9$, $C_3$-$C_9$, $C_3$-$C_8$, $C_3$-$C_7$, $C_3$-$C_6$, $C_3$-$C_5$, $C_3$-$C_4$ alkynyl group, or a cyclic $C_3$-$C_9$, $C_3$-$C_9$, $C_3$-$C_8$, $C_3$-$C_7$, $C_3$-$C_6$, $C_3$-$C_5$, $C_3$-$C_4$ alkynyl group.

It is understood that any of the exemplary alkyl, alkenyl, and alkynyl groups for $R_1$, $R_2$, and $R_3$ of Formula (II) can be heteroalkyl, heteroalkenyl, and heteroalkynyl, respectively. "Heteroalkyl," "Heteroalkenyl," and "Heteroalkynyl," as used herein, refers to straight or branched chain, or cyclic carbon containing alkyl, alkenyl, or alkynyl radicals, or combinations thereof, containing at least one heteroatom. Suitable heteroatoms include, but are not limited to, O, N, Si, P and S, wherein the nitrogen, phosphorous and sulfur atoms are optionally oxidized, and the nitrogen heteroatom is optionally quaternized.

For example, the alkyl can be a linear $C_2$-$C_{30}$ heteroalkyl, a branched $C_4$-$C_{30}$ heteroalkyl, a cyclic $C_3$-$C_{30}$ heteroalkyl (i.e. a heterocycloalkyl), a linear $C_1$-$C_{20}$ heteroalkyl, a branched $C_4$-$C_{20}$ heteroalkyl, a cyclic $C_3$-$C_{20}$ heteroalkyl, a linear $C_1$-$C_{10}$ heteroalkyl, a branched $C_4$-$C_{10}$ heteroalkyl, a cyclic $C_3$-$C_{10}$ heteroalkyl, a linear $C_1$-$C_6$ heteroalkyl, a branched $C_4$-$C_6$ heteroalkyl, a cyclic $C_3$-$C_6$ heteroalkyl, a linear $C_1$-$C_4$ heteroalkyl, cyclic $C_3$-$C_4$ heteroalkyl, such as a linear $C_1$-$C_{10}$, $C_1$-$C_9$, $C_1$-$C_8$, $C_1$-$C_7$, $C_1$-$C_6$, $C_1$-$C_5$, $C_1$-$C_4$, $C_1$-$C_3$, $C_1$-$C_2$ heteroalkyl group, a branched $C_3$-$C_9$, $C_3$-$C_9$, $C_3$-$C_8$, $C_3$-$C_7$, $C_3$-$C_6$, $C_3$-$C_5$, $C_3$-$C_4$ heteroalkyl group, or a cyclic $C_3$-$C_9$, $C_3$-$C_9$, $C_3$-$C_8$, $C_3$-$C_7$, $C_3$-$C_6$, $C_3$-$C_5$, $C_3$-$C_4$ heteroalkyl group.

The alkenyl for $R_1$, $R_2$, and $R_3$ of Formula (II) can be a linear $C_2$-$C_{30}$ heteroalkenyl, a branched $C_4$-$C_{30}$ heteroalkenyl, a cyclic $C_3$-$C_{30}$ heteroalkenyl (i.e. a heterocycloalkenyl), a linear $C_1$-$C_{20}$ heteroalkenyl, a branched $C_4$-$C_{20}$ heteroalkenyl, a cyclic $C_3$-$C_{20}$ heteroalkenyl, a linear $C_1$-$C_{10}$ heteroalkenyl, a branched $C_4$-$C_{10}$ heteroalkenyl, a cyclic $C_3$-$C_{10}$ heteroalkenyl, a linear $C_1$-$C_6$ heteroalkenyl, a branched $C_4$-$C_6$ heteroalkenyl, a cyclic $C_3$-$C_6$ heteroalkenyl, a linear $C_1$-$C_4$ heteroalkenyl, cyclic $C_3$-$C_4$ heteroalkenyl, such as a linear $C_1$-$C_{10}$, $C_1$-$C_9$, $C_1$-$C_8$, $C_1$-$C_7$, $C_1$-$C_6$, $C_1$-$C_5$, $C_1$-$C_4$, $C_1$-$C_3$, $C_1$-$C_2$ heteroalkenyl group, a branched $C_3$-$C_9$, $C_3$-$C_9$, $C_3$-$C_8$, $C_3$-$C_7$, $C_3$-$C_6$, $C_3$-$C_5$, $C_3$-$C_4$ heteroalkenyl group, or a cyclic $C_3$-$C_9$, $C_3$-$C_9$, $C_3$-$C_8$, $C_3$-$C_7$, $C_3$-$C_6$, $C_3$-$C_5$, $C_3$-$C_4$ heteroalkenyl group.

The alkynyl for $R_1$, $R_2$, and $R_3$ of Formula (II) can be a linear $C_2$-$C_{30}$ heteroalkynyl, a branched $C_4$-$C_{30}$ heteroalkynyl, a cyclic $C_3$-$C_{30}$ heteroalkynyl (i.e. a heterocycloalkynyl), a linear $C_1$-$C_{20}$ heteroalkynyl, a branched $C_4$-$C_{20}$ heteroalkynyl, a cyclic $C_3$-$C_{20}$ heteroalkynyl, a linear $C_1$-$C_{10}$ heteroalkynyl, a branched $C_4$-$C_{10}$ heteroalkynyl, a cyclic $C_3$-$C_{10}$ heteroalkynyl, a linear $C_1$-$C_6$ heteroalkynyl, a branched $C_4$-$C_6$ heteroalkynyl, a cyclic $C_3$-$C_6$ heteroalkynyl, a linear $C_1$-$C_4$ heteroalkynyl, cyclic $C_3$-$C_4$ heteroalkynyl, such as a linear $C_1$-$C_{10}$, $C_1$-$C_9$, $C_1$-$C_8$, $C_1$-$C_7$, $C_1$-$C_6$, $C_1$-$C_5$, $C_1$-$C_4$, $C_1$-$C_3$, $C_1$-$C_2$ heteroalkynyl group, a branched $C_3$-$C_9$, $C_3$-$C_9$, $C_3$-$C_8$, $C_3$-$C_7$, $C_3$-$C_6$, $C_3$-$C_5$, $C_3$-$C_4$ heteroalkynyl group, or a cyclic $C_3$-$C_9$, $C_3$-$C_9$, $C_3$-$C_8$, $C_3$-$C_7$, $C_3$-$C_6$, $C_3$-$C_5$, $C_3$-$C_4$ heteroalkynyl group.

The aryl group for $R_1$, $R_2$, and $R_3$ of Formula (II) can be a $C_5$-$C_{30}$ aryl, a $C_5$-$C_{20}$ aryl, a $C_5$-$C_{12}$ aryl, a $C_5$-$C_{11}$ aryl, a $C_5$-$C_9$ aryl, a $C_6$-$C_{20}$ aryl, a $C_6$-$C_{12}$ aryl, a $C_6$-$C_{11}$ aryl, or a $C_6$-$C_9$ aryl. It is understood that the aryl can be a heteroaryl, such as a $C_5$-$C_{30}$ heteroaryl, a $C_5$-$C_{20}$ heteroaryl, a $C_5$-$C_{12}$ heteroaryl, a $C_5$-$C_{11}$ heteroaryl, a $C_5$-$C_9$ heteroaryl, a $C_6$-$C_{30}$ heteroaryl, a $C_6$-$C_{20}$ heteroaryl, a $C_6$-$C_{12}$ heteroaryl, a $C_6$-$C_{11}$ heteroaryl, or a $C_6$-$C_9$ heteroaryl. The polyaryl group can be a $C_{10}$-$C_{30}$ polyaryl, a $C_{10}$-$C_{20}$ polyaryl, a $C_{10}$-$C_{12}$ polyaryl, a $C_{10}$-$C_{11}$ polyaryl, or a $C_{12}$-$C_{20}$ polyaryl. It is understood that the aryl can be a polyheteroaryl, such as a $C_{10}$-$C_{30}$ polyheteroaryl, a $C_{10}$-$C_{20}$ polyheteroaryl, a $C_{10}$-$C_{12}$ polyheteroaryl, a $C_{10}$-$C_{11}$ polyheteroaryl, or a $C_{12}$-$C_{20}$ polyheteroaryl.

The term "aryl" as used herein refers to any $C_5$-$C_{26}$ carbon-based aromatic group, heteroaromatic, fused aromatic, or fused heteroaromatic. For example, "aryl," as used herein can include 5-, 6-, 7-, 8-, 9-, 10-, 14-, 18-, and 24-membered single-ring aromatic groups, including, but not limited to, benzene, naphthalene, anthracene, phenanthrene, chrysene, pyrene, corannulene, coronene, etc. "Aryl" further encompasses polycyclic ring systems having two or more cyclic rings in which two or more carbons are common to two adjoining rings (i.e., "fused aromatic rings"), wherein at least one of the rings is aromatic, e.g., the other cyclic ring or rings can be cycloalkyls, cycloalkenyls, cycloalkynyls, aryls and/or heterocycles. The aryl group can be substituted with one or more groups including, but not limited to, alkyl, alkynyl, alkenyl, aryl, halide, nitro, amino, ester, ketone, aldehyde, hydroxy, carboxylic acid, or alkoxy.

"Heterocyclyl" refers to a cyclic radical attached via a ring carbon or nitrogen atom of a non-aromatic monocyclic or polycyclic ring containing 3-30 ring atoms, 3-20 ring atoms, 3-10 ring atoms, or 5-6 ring atoms, where each ring contains carbon and one to four heteroatoms each selected from the group consisting of non-peroxide oxygen, sulfur, and N(Y) wherein Y is absent or is H, O, $C_1$-$C_{10}$ alkyl, phenyl or benzyl, and optionally containing 1-3 double bonds and optionally substituted with one or more substituents. Heterocyclyl are distinguished from heteroaryl by definition. Heterocycles can be a heterocycloalkyl, a heterocycloalkenyl, a heterocycloalkynyl, etc., such as piperazinyl, piperidinyl, piperidonyl, 4-piperidonyl, dihydrofuro[2,3 b]tetrahydrofuran, morpholinyl, piperazinyl, piperidinyl, piperidonyl, 4 piperidonyl, piperonyl, pyranyl, 2H-pyrrolyl, 4H-quinolizinyl, quinuclidinyl, tetrahydrofuranyl, 6H-1,2,5-thiadiazinyl. Heterocyclic groups can optionally be substituted with one or more substituents as described above for alkyl and aryl.

The term "heteroaryl" refers to $C_5$-$C_{30}$ membered aromatic, fused aromatic, biaromatic ring systems, or combinations thereof, in which one or more carbon atoms on one or more aromatic ring structures have been substituted with a heteroatom. Suitable heteroatoms include, but are not limited to, oxygen, sulfur, and nitrogen. "Heteroaryl," as used herein, includes 5-, 6-, 7-, 8-, 9-, 10-, 14-, 18-, and 24-membered single ring aromatic groups that may include from one to four heteroatoms, for example, pyrrole, furan, thiophene, imidazole, oxazole, thiazole, triazole, tetrazole, pyrazole, pyridine, pyrazine, pyridazine and pyrimidine, and the like. The heteroaryl group may also be referred to as "aryl heterocycles" or "heteroaromatics". "Heteroaryl" further encompasses polycyclic ring systems having two or more rings in which two or more carbons are common to two adjoining rings (i.e., "fused rings") wherein at least one of the rings is heteroaromatic, e.g., the other cyclic ring or rings can be cycloalkyls, cycloalkenyls, cycloalkynyls, aryls, heterocycles, or combinations thereof. Examples of heteroaryl rings include, but are not limited to, benzimidazolyl, benzofuranyl, benzothiofuranyl, benzothiophenyl, benzoxazolyl, benzoxazolinyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H,6H-1,5,2-dithiazinyl, furanyl, furazanyl, imidazolidinyl, imidazolinyl, imidazolyl, 1H indazolyl, indolenyl, indolinyl, indolizinyl, indolyl, 3H indolyl, isatinoyl, isobenzofuranyl, isochromanyl, isoindazolyl, isoindolinyl, isoindolyl, isoquinolinyl, isothiazolyl, isoxazolyl, methylenedioxyphenyl, naphthyridinyl, octahydroisoquinolinyl, 1,2,3-oxadiazolyl, 1,2,4-oxadiazolyl, 1,2,5-oxadiazolyl, 1,3,4-oxadiazolyl, oxazolidinyl, oxazolyl, oxindolyl, pyrimidinyl, phenanthridinyl, phenanthrolinyl, phenazinyl, phenothiazinyl, phenoxathinyl, phenoxazinyl, phthalazinyl, pteridinyl, purinyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, pyrrolyl, quinazolinyl, quinolinyl, quinoxalinyl, tetrahydroisoquinolinyl, tetrahydroquinolinyl, tetrazolyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl and xanthenyl.

The term "polyaryl" refers to a chemical moiety that includes two or more aryls, heteroaryls, and combinations thereof. The aryls, heteroaryls, and combinations thereof, are fused, or linked via a single bond, ether, ester, carbonyl, amide, sulfonyl, sulfonamide, alkyl, azo, and combinations thereof. For example, a "polyaryl" can be polycyclic ring systems having two or more cyclic rings in which two or more carbons are common to two adjoining rings (i.e., "fused aromatic rings"), wherein two or more of the rings are aromatic. When two or more heteroaryls are involved, the chemical moiety can be referred to as a "polyheteroaryl."

The term "aralkyl" as used herein is an aryl group or a heteroaryl group having an alkyl, alkynyl, or alkenyl group as described above attached to the aromatic group, such as an aryl, a heteroaryl, a polyaryl, or a polyheteroaryl. An example of an aralkyl group is a benzyl group.

The terms "alkoxyl" or "alkoxy," "aroxy" or "aryloxy," generally describe compounds represented by the formula —OR$^v$, wherein R$^v$ includes, but is not limited to, a substituted or unsubstituted alkyl, a substituted or unsubstituted alkenyl, a substituted or unsubstituted alkynyl, a substituted or unsubstituted cycloalkyl, a substituted or unsubstituted heterocyclyl, a substituted or unsubstituted cycloalkenyl, a substituted or unsubstituted heterocycloalkenyl, a substituted or unsubstituted aryl, a substituted or unsubstituted heteroaryl, a substituted or unsubstituted polyaryl, a substituted or unsubstituted polyheteroaryl, a substituted or unsubstituted arylalkyl, a substituted or unsubstituted heteroalkyl, a substituted or unsubstituted alkylaryl, a substituted or unsubstituted alkylheteroaryl, a substituted or unsubstituted aralkyl, a substituted or unsubstituted carbonyl, a thiol, an amido, and an amino. Exemplary alkoxyl groups include methoxy, ethoxy, propyloxy, tert-butoxy and the like. A "lower alkoxy" group is an alkoxy group containing from one to six carbon atoms. An "ether" is two functional groups covalently linked by an oxygen as described below. Accordingly, the substituent of an alkyl that renders that alkyl an ether is or resembles an alkoxyl, such as can be represented by one of —O-alkyl, —O-alkenyl, —O-alkynyl, —O-aryl, —O-heteroaryl, —O-polyaryl, —O-polyheteroaryl, —O-heterocyclyl, etc.

The terms "aroxy" and "aryloxy," as used interchangeably herein, are represented by —O-aryl or —O-heteroaryl, wherein aryl and heteroaryl are as described herein.

The term "amino" as used herein includes the group

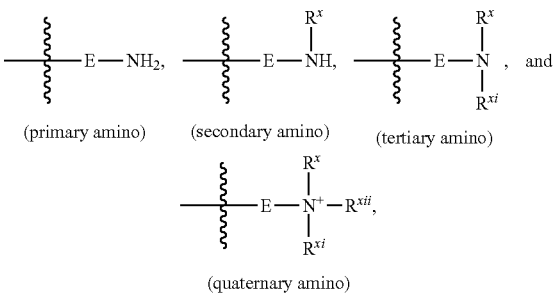

wherein, E is absent, or E is substituted or unsubstituted alkyl, substituted or unsubstituted alkenyl, substituted or unsubstituted alkynyl, substituted or unsubstituted aralkyl, substituted or unsubstituted aryl, substituted or unsubstituted heteroaryl, a substituted or unsubstituted polyaryl, a substituted or unsubstituted polyheteroaryl, substituted or unsubstituted heterocyclyl, wherein independently of E, R$^x$, R$^{xi}$, and R$^{xii}$ each independently represent a substituted or unsubstituted alkyl, a substituted or unsubstituted alkenyl, a substituted or unsubstituted alkynyl, a substituted or unsubstituted carbonyl, a substituted or unsubstituted heterocyclyl, a substituted or unsubstituted aralkyl (e.g. a substituted or unsubstituted alkylaryl, a substituted or unsubstituted arylalkyl), a substituted or unsubstituted aryl, a substituted or unsubstituted heteroaryl, a substituted or unsubstituted polyaryl, a substituted or unsubstituted polyheteroaryl, a substituted or unsubstituted heterocyclyl, a hydroxyl, an alkoxy, a thiol, an amido, an amino, or —(CH$_2$)$_m$—R'''; R''' represents a hydroxyl group, a substituted or unsubstituted carbonyl group, a substituted or unsubstituted aryl, a substituted or unsubstituted cycloalkyl, a substituted or unsubstituted cycloalkenyl, a substituted or unsubstituted heterocyclyl, a substituted or unsubstituted aryl, a substituted or unsubstituted heteroaryl, a substituted or unsubstituted polyaryl, a substituted or unsubstituted polyheteroaryl, an alkoxy, an amido, or an amino; and m is zero or an integer ranging from 1 to 8. The term "quaternary amino" also includes the groups where the nitrogen, R$^x$, R$^{xi}$, and R$^{xii}$ with the N$^+$ to which they are attached complete a heterocyclyl or heteroaryl having from 3 to 14 atoms in the ring structure.

The terms "amide" or "amido" are used interchangeably, refer to both "unsubstituted amido" and "substituted amido" and are represented by the general formula:

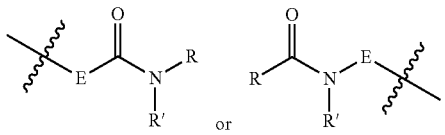

wherein, E is absent, or E is a substituted or unsubstituted alkyl, a substituted or unsubstituted alkenyl, a substituted or unsubstituted alkynyl, a substituted or unsubstituted aralkyl, a substituted or unsubstituted aryl, substituted or unsubstituted heteroaryl, a substituted or unsubstituted polyaryl, a substituted or unsubstituted polyheteroaryl, or a substituted or unsubstituted heterocyclyl, wherein independently of E, R and R' each independently represent a hydrogen, a substituted or unsubstituted alkyl, a substituted or unsubstituted alkenyl, a substituted or unsubstituted alkynyl, a substituted or unsubstituted carbonyl, a substituted or unsubstituted heterocyclyl, a substituted or unsubstituted aralkyl (e.g. a substituted or unsubstituted alkylaryl, a substituted or unsubstituted arylalkyl), a substituted or unsubstituted aryl, a substituted or unsubstituted heteroaryl, a substituted or unsubstituted polyaryl, a substituted or unsubstituted polyheteroaryl, a substituted or unsubstituted heterocyclyl, a hydroxyl, an alkoxy, a thiol, an amido, an amino, or —(CH$_2$)$_m$—R'", or R and R' taken together with the N atom to which they are attached complete a heterocycle having from 3 to 14 atoms in the ring structure; R'" represents a hydroxyl group, a substituted or unsubstituted carbonyl group, a substituted or unsubstituted aryl, a substituted or unsubstituted cycloalkyl, a substituted or unsubstituted cycloalkenyl, a substituted or unsubstituted heterocyclyl, a substituted or unsubstituted aryl, a substituted or unsubstituted heteroaryl, a substituted or unsubstituted polyaryl, a substituted or unsubstituted polyheteroaryl, an azido, an alkoxy, an amido, or an amino; and m is zero or an integer ranging from 1 to 8. In some forms, when E is oxygen, a carbamate is formed.

"Carbonyl," as used herein, is art-recognized and includes such moieties as can be represented by the general formula:

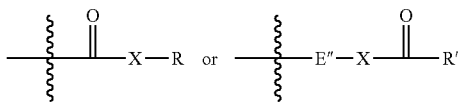

wherein X is a bond, or represents an oxygen or a sulfur, and R represents a hydrogen, a substituted or unsubstituted alkyl, a substituted or unsubstituted alkenyl, a substituted or unsubstituted alkynyl, a substituted or unsubstituted carbonyl, a substituted or unsubstituted heterocyclyl, a substituted or unsubstituted aralkyl (e.g. a substituted or unsubstituted alkylaryl, a substituted or unsubstituted arylalkyl), a substituted or unsubstituted aryl, a substituted or unsubstituted heteroaryl, a substituted or unsubstituted polyaryl, a substituted or unsubstituted polyheteroaryl, a substituted or unsubstituted heterocyclyl, a hydroxyl, an alkoxy, an azido, an amido, an amino, or —(CH$_2$)$_m$—R", or a pharmaceutical acceptable salt; E" is absent, or E" is substituted or unsubstituted alkyl, substituted or unsubstituted alkenyl, substituted or unsubstituted alkynyl, substituted or unsubstituted aralkyl, substituted or unsubstituted aryl, substituted or unsubstituted heteroaryl, a substituted or unsubstituted polyaryl, a substituted or unsubstituted polyheteroaryl, substituted or unsubstituted heterocyclyl; R' represents a hydrogen, a substituted or unsubstituted alkyl, a substituted or unsubstituted alkenyl, a substituted or unsubstituted alkynyl, a substituted or unsubstituted carbonyl, a substituted or unsubstituted heterocyclyl, a substituted or unsubstituted aralkyl (e.g. a substituted or unsubstituted alkylaryl, a substituted or unsubstituted arylalkyl), a substituted or unsubstituted aryl, a substituted or unsubstituted heteroaryl, a substituted or unsubstituted polyaryl, a substituted or unsubstituted polyheteroaryl, a substituted or unsubstituted heterocyclyl, a hydroxyl, an alkoxy, an amido, an amino, or —(CH$_2$)$_m$—R"; R" represents a hydroxyl group, a substituted or unsubstituted carbonyl group, a substituted or unsubstituted aryl, a substituted or unsubstituted cycloalkyl, a substituted or unsubstituted cycloalkenyl, a substituted or unsubstituted heterocyclyl, a substituted or unsubstituted aryl, a substituted or unsubstituted heteroaryl, a substituted or unsubstituted polyaryl, a substituted or unsubstituted polyheteroaryl, an alkoxy, an amido, or an amino; and m is zero or an integer ranging from 1 to 8. Where X is oxygen and R is described as above, the moiety is also referred to as a carboxyl group. Where X is oxygen and R is hydrogen, the formula represents a "carboxylic acid". Where X is oxygen and R' is hydrogen, the formula represents a "formate". Where X is oxygen and R or R' is not hydrogen, the formula represents an "ester". In general, where the oxygen atom of the above formula is replaced by a sulfur atom, the formula represents a "thiocarbonyl" group. Where X is sulfur and R or R' is not hydrogen, the formula represents a "thioester". Where X is sulfur and R is hydrogen, the formula represents a "thiocarboxylic acid". Where X is sulfur and R' is hydrogen, the formula represents a "thioformate". Where X is a bond and R is not hydrogen, the above formula represents a "ketone". Where X is a bond and R is hydrogen, the above formula represents an "aldehyde".

The term "carboxyl" is as described above for carbonyl and is described more specifically by the formula —R$^{iv}$COOH, wherein R$^{iv}$ is a substituted or unsubstituted alkyl, a substituted or unsubstituted alkenyl, a substituted or unsubstituted alkynyl, a substituted or unsubstituted heterocyclyl, a substituted or unsubstituted alkylaryl, a substituted or unsubstituted arylalkyl, a substituted or unsubstituted aryl, a substituted or unsubstituted polyaryl, a substituted or unsubstituted polyheteroaryl, or a substituted or unsubstituted heteroaryl.

The term "phenoxy" refers to a compound of the formula —OR$^v$ wherein R$^v$ is (i.e., —O—C$_6$H$_5$). A phenoxy is a species of the aroxy genus.

The terms "thiol" are used interchangeably and are represented by —SR, where R can be a hydrogen, a sugar group, a substituted or unsubstituted alkyl, a substituted or unsubstituted alkenyl, a substituted or unsubstituted alkynyl, a substituted or unsubstituted heterocyclyl, a substituted or unsubstituted aryl, a substituted or unsubstituted heteroaryl, a substituted or unsubstituted aralkyl (e.g. a substituted or unsubstituted alkylaryl, a substituted or unsubstituted arylalkyl, etc.), a substituted or unsubstituted polyaryl, a substituted or unsubstituted polyheteroaryl, a substituted or unsubstituted carbonyl, an amido, an amino, an azido, an alkoxy, or an oxo, described above.

ii. Post-Framework Modification

When the imidazolate linker is a modified imidazole compound, the modification may be performed prior to ZIF assembly or following ZIF assembly (also referred herein as "post-framework functionalization").

For example, the imidazolate linker used to form the ZIF is a modified imidazole compound. Alternatively, the imidazolate linker used to form the ZIF is an unmodified imidazole compound, and the ZIF may be further modified with reacting with one or more post-framework reactants to introduce one or more functional group(s) as described above on the imidazolate linker. For example, the ZIF is formed by unmodified imidazole compounds and then further modified with one or more post-framework reactants to introduce amino, hydroxyl, thiol, aldehyde, or carboxyl, or a combination thereof on the imidazolate linker.

Methods and reactions for introducing functional groups on an unmodified imidazole compound, prior to ZIF assembly or post-framework functionalization, are known, such as those described in Bellina and Rossi, *Adv. Synth. Catal.*, 352:1223 (2010).

2. Targeting Ligands

The nanoparticles include a targeting ligand, optionally more than one targeting ligand, that targets a reproductive hormone or the receptor of a reproductive hormone. Typically, the targeting ligand is arranged on the outer surface of the cage such that it is exposed to the surrounding environment. The targeting ligand is directly attached to the outer surface of the cage and/or is conjugated to a surface modifying agent through which it attaches to the outer surface of the cage. For example, the targeting ligand is arranged on the outer surface of the ZIF such that it is exposed to the surrounding environment. The targeting ligand is directly attached to the outer surface of the ZIF and/or is conjugated to a surface modifying agent through which it attaches to the outer surface of the ZIF, as described below. The description below describes nanoparticles that contain a ZIF cage. However, these descriptions apply to other suitable materials for forming the cage, as well, such as those described above. Thus the references to a "ZIF" or "ZIF cage" herein also generally apply to other suitable materials for forming a cage.

Optionally, the targeting ligand is directly attached to the outer surface of the ZIF through an ionic bond, a covalent bond, a polar covalent bond, or Van der Waals interactions, or a combination thereof. For example, the targeting ligand contains a chemical moiety containing one or more charges (negative charges or positive charges), such that it can ionically bind to the metal ions or the imidazolate linkers of the ZIFs and thereby attach to the outer surface of the ZIF.

Generally, the targeting ligand can bind to a reproductive hormone or the receptor of a reproductive hormone. Reproduction in animals is a complex phenomenon characterized by a delicate balance between the hypothalamus, pituitary and the gonads. Hormones play an important role in this process. The interplay between hormones secreted by the hypothalamus, pituitary, and gonads contributes to the timely reproductive cycles that are crucial for ovulation, implantation of the zygote, and development of the offspring. Targeting reproductive hormones or their receptors can stop reproductive cycles in females or to reduce sperm production in males.

a. Exemplary Targeting Ligands

The nanoparticles include at least one of the following targeting ligands: a gonadotropin-releasing hormone ("GnRH") agonist, a follicle stimulating hormone ("FSH") receptor agonist, or a luteinizing hormone ("LH") receptor agonist, or a combination thereof. Optionally, the nanoparticles include one or more additional targeting ligands.

For example, the targeting ligand included in the nanoparticles is buserelin, azagly-naflorein, deslorelin, fertirelin, gonadorelin, goserelin, histrelin, lecirelin, leuprorelin, nafarelin, peforelin, peforelin acetate, triptorelin, leuprolide, leuprolide acetate, abarelix, cetorelix, degarelix, elagolix, ganirelix, linzagolix, relugolix, thiazolidinone compound 5, hexahydroquinoline derivative Org 214444-0, thienopyrimidine derivatives, such as thienopyrimidine derivative Org 43553, 5-amino-N-(tert-butyl)-4-(3-(isonicotinamido)phenyl)-2-(methylthio)thieno-[2,3-d]pyrimidine-6-carboxamide, 5-amino-N-(tert-butyl)-2-(methylthio)-4-(3-(thiophene-3-carboxamido)phenyl thieno[2,3-d]pyrimidine-6-carboxamide, 5-amino-N-(tert-butyl-2-(methylsulfonyl)-4-(3-(nicotinamido)phenyl)thieno[2,3-d]pyrimidine-6-carboxamide, 5-amino-N-(tert-butyl-4-(3-(1-methyl-1H-pyrazole-4-carboxamido)phenyl)-2-(methylsulfanyl)thieno[2,3-d]pyrimidine-6-carboxamide, 5-amino-N-(tert-butyl)-4-(3-(2-metoxynicotinamido)phenyl)-2-(methylthio)thieno[2,3-d]pyrimidine-6-carboxamide, 4-((3-(5-amino-6-(tert-butylcarbamoyl)-2-(methylthio)thieno[2,3-d]pyrimidine-4-yl)phenyl)carbamoyl)pyridine 1-oxide, and 5-amino-N-(tert-butyl)-4-(3-(2-chloronicotinamido)phenyl)-2-(methylthio)thieno[2,3-d]pyrimidine-6-carboxamide; a diketopiperazine, or m-dihydropyridine, or a combination thereof.

In some embodiments, the targeting ligand included in the nanoparticles is buserelin.

3. Surface Modifying Agents a. Chemical Moiety for ZIF Attachment

The nanoparticles include a surface modifying agent, optionally more than one surface modifying agent, that attach to the outer surface of the cage. The surface modifying agent can attach to the outer surface of the cage through an ionic bond, a covalent bond, a polar covalent bond, or Van der Waals interactions, or a combination thereof. For example, the nanoparticles include a surface modifying agent, optionally more than one surface modifying agent, that attaches to the outer surface of the ZIF, where the surface modifying agent attaches to the outer surface of the ZIF through an ionic bond, a covalent bond, a polar covalent bond, or Van der Waals interactions, or a combination thereof. The description below describes nanoparticles that contain a ZIF cage. However, these descriptions apply to other suitable materials for forming the cage, as well, such as those described above. Thus the references to a "ZIF" or "ZIF cage" herein also generally apply to other suitable materials for forming a cage.

Optionally, the surface modifying agent attaches to the outer surface of the ZIF though an ionic bond. In these embodiments, the surface modifying agent may contain a chemical moiety containing one or more charges (positive charges or negative charges), such that it forms ionic bonding with the metal ions or the imidazolate linkers of the ZIF and thereby attaches to the outer surface of the ZIF. The charged chemical moiety can be on any suitable location of the surface modifying agent. For example, when the surface modifying agent is a polymer, the charged chemical moiety can be incorporated in any location in the backbone of the polymer, conjugated to one end or both ends of the polymer backbone, conjugated to the polymer backbone as a side group, or conjugated to a side chain of the polymer.

For example, the end of the surface modifying agent can contain a chemical moiety containing one or more charges (positive charges or negative charges), such that it forms ionic bonding with the metal ions or the imidazolate linkers of the ZIF and thereby attaches to the outer surface of the ZIF though the chemical moiety. For example, the end of the surface modifying agent contains a chemical moiety containing one or more negative charges, such that it forms ionic bonding with the metal ions of the ZIF and thereby attaches to the outer surface of the ZIF through the chemical moiety. For example, the end of the surface modifying agent contains a chemical moiety containing one or more positive charges, such that it ionically binds with one or more negative charges on the imidazolate linkers of the ZIF.

Optionally, the surface modifying agent itself contains one or more charges (positive charges or negative charges), such that it forms ionic bonds with the metal ions or the imidazolate linkers of the ZIF and thereby attaches to the outer surface of the ZIF though the chemical moiety. For example, the surface modifying agent contains a positively charged polyethylenimine backbone, such that if forms ionic bonding with the imidazolate linkers of the ZIF.

Examples of chemical moieties suitable to be incorporated in or conjugated to the surface modifying agent include, but are not limited to folate, L-methylfolate (5-MTHF), and glutamate, and a combination thereof.

b. Polymers

The surface modifying agent included in the nanoparticles can contain a polymer backbone. Any suitable polymer backbone can be used in forming the surface modifying agent of the nanoparticles. The polymer backbone can be hydrophobic or hydrophilic, or contain blocks that are hydrophobic and blocks that are hydrophilic. For example, the polymer backbone can be formed from hydrophobic monomers, hydrophilic monomers, or a combination of hydrophobic monomers and hydrophilic monomers.

Examples of suitable polymer backbones for forming the surface modifying agent include, but are not limited to, polyalkylene glycol, polylactic acid, polyglycolic acid, poly (lactic-co-glycolic acid), polyanhydrides, poly(ortho)esters, polyurethanes, poly(butyric acid), poly(valeric acid), poly (lactide-coaprolactone), and polyethylenimine, and a copolymer thereof.

For example, the polymer backbone of the surface modifying agent is polyethylene glycol.

The polymer backbone of the surface modifying agent may be unmodified or modified with one or more functional groups. The functional groups can be conjugated to the backbone of the polymer, conjugated to one end or both ends of the polymer backbone, or conjugated to a side chain of the polymer. For example, the polymer backbone of the surface modifying agent is modified to introduce one or more functional groups, such as amino, hydroxyl, thiol, aldehyde, or carboxyl, or a combination thereof. Surface modifying agents with functionalized polymer backbone are commercially available, for example, functionalized polyethylene glycols by Sigma Aldrich.

i. Molecular Weight

Generally, the polymer backbone of the surface modifying agent can have a molecular weight in a range from about 1 kDa to about 10 kDa. Optionally, the polymer backbone of the surface modifying agent has a molecular weight in a range from about 2 kDa to about 10 kDa, from about 3 kDa to about 10 kDa, from about 4 kDa to about 10 kDa, from about 1 kDa to about 9 kDa, from about 2 kDa to about 9 kDa, from about 3 kDa to about 9 kDa, from about 4 kDa to about 9 kDa, from about 1 kDa to about 8 kDa, from about 2 kDa to about 8 kDa, from about 3 kDa to about 8 kDa, from about 4 kDa to about 8 kDa, from about 1 kDa to about 7 kDa, from about 2 kDa to about 7 kDa, from about 3 kDa to about 7 kDa, from about 4 kDa to about 7 kDa, from about 1 kDa to about 6 kDa, from about 2 kDa to about 6 kDa, from about 3 kDa to about 6 kDa, or from about 4 kDa to about 6 kDa.

For example, the polymer backbone of the surface modifying agent can have a molecular weight of about 5 kDa.

ii. Targeting Ligand Conjugation

Optionally, the surface modifying agent has a targeting ligand or more than one targeting ligand conjugated thereto. The targeting ligand may be conjugated to the backbone of the polymer, conjugated to one end of the polymer backbone, or conjugated to a side chain of the polymer, as long as the targeting ligand is exposed to the surrounding environment following nanoparticle assembly.

For example, the surface modifying agent has a first end that contains a charged chemical moiety, and a second end that is opposite to the first end and contains a targeting ligand conjugated thereto. In such embodiments, when the surface modifying agent is attached to the outer surface of the ZIF through the first end by ionic bonding, the second end containing the targeting ligand conjugated thereto is exposed to the surrounding environment.

Optionally, at least 20 wt % (weight of the surface modifying agent conjugated to the targeting ligand/total weight of the surface modifying agent attached to the cage) of the surface modifying agent is conjugated to the targeting ligand. For example, at least 20 wt % (weight of the surface modifying agent conjugated to the targeting ligand/total weight of the surface modifying agent attached to the ZIF) of the surface modifying agent is conjugated to the targeting ligand. For example, at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, in a range from 20 wt % to 100 wt %, from 30 wt % to 100 wt %, or from 40 wt % to 100 wt % of the surface modifying agent is conjugated to the targeting ligand.

4. Active Agents

The nanoparticles include an active agent, optionally more than one active agent, encapsulated in the cage. For example, the nanoparticles include an active agent, optionally more than one active agent, encapsulated in the ZIF. Typically, the active agent can inactivate ribosomes of gonadotrophs or induce apoptosis of gonadotrophs to reduce or prevent secretion of luteinizing hormone and/or follicle stimulating hormone, decrease the level of a gonadal hormone (e.g., estrogen and/or testosterone) in the blood, and/or inhibit development of ovarian follicles or reduce or prevent sperm production, and thereby inactivate ovaries or testes of a subject.

The description below describes nanoparticles that contain a ZIF cage. However, these descriptions apply to other suitable materials for forming the cage, as well. Thus the references to a "ZIF" or "ZIF cage" herein also generally apply to other suitable materials for forming a cage.

Optionally, the active agent encapsulated in the ZIF of the nanoparticles is a ribosome inactivating protein, a hormone, an apoptosis inducer, a receptor ligand, or a nucleic acid, or a combination thereof, that inactivates ribosomes of gonadotroph or induces apoptosis of gonadotrophs to reduce or prevent secretion of luteinizing and/or follicle stimulating hormone, decrease the level of a gonadal hormone (e.g., estrogen and/or testosterone) in the blood, and/or inhibit development of ovarian follicles or reduce or prevent sperm production of a subject.

Optionally, the active agent is stable when stored at 4° C. or room temperature for a period of time of at least 1 month, at least 6 months, at least 1 year, or up to 2 years. Optionally, the active agent is soluble in water and/or ethanol.

For example, the active agent encapsulated in the ZIF of the nanoparticles is a ribosome inactivating protein, such as saporin, gelonin, or pokeweed antiviral protein ("PAP"), or a combination thereof. Other examples of ribosome inactivating proteins suitable for encapsulation in the ZIF include, but are not limited to, trichosanthin ("TCS"), bryodin, luffaculin, beta-luffin, a-momorcharin, cucurmosin, MAP30, b-momorcharin, GAP31, ricin, ebulin, abrus, mistletoe, bouganin, PD-L4, dianthin, lychnin, MOD, charybdin, shiga, and cinnamomin, and a combination thereof.

For example, the active agent encapsulated in the ZIF structure of the nanoparticles is an apoptosis inducer, such as (±)-anatoxin A fumarate, actinomycin D, adriamycin, anisomycin, apoptosis activator 2, AT-101, betulinic acid, bioymifi, Bz 423, $C_{75}$, camptothecin, carboplatin, chaetoglobosin A, cisplatin, clindamycin hydrochloride, cycloheximide, 2,3,-DCPE hydrochloride, daptomycin, daunorubicin hydrochloride, doxorubicin hydrochloride, ellipticine, epirubicin hydrochloride, G 418 disulfate, gambogic acid, gedunin, hygromycin B, kaempferol, linezolid, mithramycin A, mitomycin C, MPC 6827 hydrochloride, narciclasine, oncrasin 1, oxaliplatin, piperlongumine, puromycin dihydrochloride, rifampicin, rifaximin, SMBA 1, streptozotocin, temozolomide, tobramycin, triptolide, or trovafloxacin mesylate, or a combination thereof.

For example, more than one active agent is encapsulated in the ZIF structure of the nanoparticles, where a first active agent is a ribosome inactivating protein, such as any of the ribosome inactivating proteins described above, and a second active agent is an apoptosis inducer, such as any of the apoptosis inducers described above.

The nanoparticle can contain one or more active agents in a total concentration in the nanoparticle of at least about 0.00005 wt %, at least about 0.0001 wt %, at least about 0.0005 wt %, at least about 0.001 wt %, at least about 0.005 wt %, at least about 0.01 wt %, up to 10 wt %, up to 5 wt %, up to 1 wt %, up to 0.5 wt %, up to 0.1 wt %, in a range from about 0.00005 wt % to 10 wt %, from about 0.0001 wt % to 10 wt %, from about 0.0005 wt % to 10 wt %, from about 0.001 wt % to 10 wt %, from about 0.00005 wt % to 5 wt %, from about 0.0001 wt % to 5 wt %, from about 0.0005 wt % to 5 wt %, from about 0.001 wt % to 5 wt %, from about 0.00005 wt % to about 1 wt %, from about 0.0001 wt % to about 1 wt %, from about 0.0005 wt % to about 1 wt %, from about 0.001 wt % to 1 wt %, from about 0.00005 wt % to 0.5 wt %, from about 0.0001 wt % to 0.5 wt %, from about 0.0005 wt % to 0.5 wt %, from about 0.001 wt % to 0.5 wt %, from about 0.00005 wt % to about 0.1 wt %, from about 0.0001 wt % to about 0.1 wt %, from about 0.0005 wt % to about 0.1 wt %, from about 0.001 wt % to 0.1 wt %, from about 0.00005 wt % to 0.05 wt %, from about 0.0001 wt % to 0.05 wt %, from about 0.0005 wt % to 0.05 wt %, from about 0.001 wt % to 0.05 wt %, from about 0.00005 wt % to about 0.01 wt %, from about 0.0001 wt % to about 0.01 wt %, from about 0.0005 wt % to about 0.01 wt %, from about 0.001 wt % to 0.01 wt %, from about 0.00005 wt % to 0.005 wt %, from about 0.0001 wt % to 0.005 wt %, from about 0.0005 wt % to 0.005 wt %, from about 0.00005 wt % to about 0.001 wt %, from about 0.0001 wt % to about 0.001 wt %, or from about 0.0005 wt % to about 0.001 wt %, such as about 0.0006 wt %. The term "total concentration" with respect to the total concentration of the one or more active agents in the nanoparticle refers to the sum of the weight of all of the active agent(s) encapsulated in a nanoparticle relative to the weight of the nanoparticle.

5. Optional Components

Optionally, the nanoparticles also include a diagnostic agent encapsulated in the cage. For example, the nanoparticles also include a diagnostic agent encapsulated in the ZIF. Any suitable diagnostic agent can be encapsulated in the cage of the nanoparticles. The encapsulation of the diagnostic agent allows visualization of the nanoparticles in vivo, and thereby are useful for imaging or assessing tissues of interest.

Exemplary diagnostic agents suitable to be encapsulated in the cage, such as the ZIF of the nanoparticles include, but are not limited to, paramagnetic molecules, fluorescent/dye molecules, magnetic molecules, radionuclides, x-ray imaging agents, MRI imaging agents, ultrasound imaging agents, and contrast media.

For example, the nanoparticles includes a dye molecule encapsulated in the ZIF, such as Alexa Fluor 350, Alexa Fluor 405, Alexa Fluor 488, Alexa Fluor 532, Alexa Fluor 546, Alexa Fluor 555, Alexa Fluor 561, Alexa Fluor 568, Alexa Fluor 594, Alexa Fluor 647, Alexa Fluor 660, Alexa Fluor 680, Alexa Fluor 700, Alexa Fluor 750, pacific blue, coumarin, BODIPY FL, pacific green, oregon green, FITC, Cy3, pacific orange, PE-Cyanine7, PerCP-Cyanine5.5, TRITC, texas red, Cy5, eFLuor 450, eFluor 506, eFluor 660, PE-eFluor 610, PerCP-eFluor 710, APC-eFluor 780, super bright 436, super bright 600, super bright 645, super bright 702, super bright 780, DAPI, SYTOX green, SYTO 9, TO-PRO-3, propidium iodide, Qdot 525, Qdot 565, Qdot 605, Qdot 655, Qdot 705, Qdot 800, R-PE, APC, CFP, GFP, RFP, CF®350, CF®405S, CF®405M, CF®405L, CF®430, CF®440, CF®450, CF®488A, CF®503R, CF®514, CF®532, CF®535ST, CF®543, CF®550R, CF®555, CF®568, CF®570, CF®583, CF®583R, CF®594, CF®594ST, CF®620R, CF®633, CF®640R, CF®647, CF®660C, CF®660R, CF®680, CF®680R, CF®700, CF®750, CF®770, CF®790, CF®800, CF®820, or DyLight®649, or a combination thereof.

B. Properties

1. Surface Density of Surface Modifying Agents

Typically, the surface density of the surface modifying agent (also referred herein as "SMA") on the outer surface of the cage of the nanoparticles is sufficient to reduce non-specific protein adsorption in vivo. For example, the surface density of the SMA on the outer surface of the ZIF of the nanoparticles is sufficient to reduce non-specific protein adsorption in vivo. For example, the SMA has a surface density sufficient to achieve a brush configuration on the outer surface of the ZIF of the nanoparticles.

Optionally, the surface density of the SMA on the outer surface of the cage of the nanoparticles is at least 1 SMA/$nm^2$. For example, the surface density of the SMA on the outer surface of the cage of the nanoparticles is at least 2 SMA/$nm^2$, at least 3 SMA/$nm^2$, at least 4 SMA/$nm^2$, at least 5 SMA/$nm^2$, at least 7 SMA/$nm^2$, at least 10 SMA/$nm^2$, at least 15 SMA/$nm^2$, at least 20 SMA/$nm^2$, at least 25 SMA/$nm^2$, at least 30 SMA/$nm^2$, at least 35 SMA/$nm^2$, at least 40 SMA/$nm^2$, at least 45 SMA/$nm^2$, or at least 50 SMA/$nm^2$.

For example, the surface density of the SMA on the outer surface of the ZIF of the nanoparticles is at least 1 SMA/$nm^2$. For example, the surface density of the SMA on the outer surface of the ZIF of the nanoparticles is at least 2 SMA/$nm^2$, at least 3 SMA/$nm^2$, at least 4 SMA/$nm^2$, at least 5 SMA/$nm^2$, at least 7 SMA/$nm^2$, at least 10 SMA/$nm^2$, at least 15 SMA/$nm^2$, at least 20 SMA/$nm^2$, at least 25 SMA/$nm^2$, at least 30 SMA/$nm^2$, at least 35 SMA/$nm^2$, at least 40 SMA/$nm^2$, at least 45 SMA/$nm^2$, or at least 50 SMA/$nm^2$.

2. Nanoparticles Average Diameter

Typically, the nanoparticles have an average diameter (including the SMA) that is effective to increase nanoparticle circulation time and improve nanoparticle uptake by target cells.

Generally, the nanoparticles can have an average diameter (including the SMA) that is less than 100 nm and at least 10 nm. For example, the nanoparticles have an average diameter (including the SMA) in a range from about 10 nm to about 100 nm, from about 10 nm to about 90 nm, from about 10 nm to about 80 nm, from about 20 nm to about 100 nm, from about 20 nm to about 90 nm, from about 20 nm to about 80 nm, from about 30 nm to about 100 nm, from about 30 nm to about 90 nm, or from about 30 nm to about 80 nm.

The average diameter of the nanoparticles can be determined using a standard technique, such as using scanning electron microscopy ("SEM") or using dynamic light scattering ("DLS").

For example, the nanoparticles have an average diameter (including the SMA) of less than 100 nm, or in a range from about 10 nm to about 100 nm, from about 10 nm to about 90 nm, from about 10 nm to about 80 nm, from about 20 nm to about 100 nm, from about 20 nm to about 90 nm, from about 20 nm to about 80 nm, from about 30 nm to about 100 nm, from about 30 nm to about 90 nm, or from about 30 nm to about 80 nm, measured by DLS.

II. Pharmaceutical Formulations

Pharmaceutical formulations that contain nanoparticles in a form suitable for administration to a mammal, and particularly for delivery to the pituitary and/or ovaries or testes of the mammal, are disclosed. The pharmaceutical formulations may contain a plurality of the nanoparticles described herein. The nanoparticles in the plurality of nanoparticles may be formed from the same components or different components. For example, the nanoparticles in the plurality of nanoparticles contained in the pharmaceutical formulation are all the same, i.e. formed from the same cage, such as the same ZIF, same surface modifying agent, same targeting ligand, and same active agent. For example, one or more of the nanoparticles in the plurality of nanoparticles are formed from a cage, a surface modifying agent, a targeting ligand, and/or an active agent that is(are) different from the cage, surface modifying agent, targeting ligand, and/or active agent forming one or more of the other nanoparticles in the plurality of nanoparticles. For example, a first set of nanoparticles in the plurality of nanoparticles contained in the pharmaceutical formulation is formed from a first ZIF, a first surface modifying agent, a first targeting ligand, and a first active agent; and a second set of nanoparticles in the plurality of nanoparticles contained in the pharmaceutical formulation is formed from a second ZIF, a second surface modifying agent, a second targeting ligand, and a second active agent, where the first ZIF is the same or different from the second ZIF, the first surfacing modifying agent is the same or different from the second surface modifying agent, the first targeting ligand is the same or different from the second targeting ligand, and the first active agent is the same or different from the second active agent.

Typically, the active agent(s) in the pharmaceutical formulation is present in an amount effective to inactivate ribosomes of gonadotroph or induce apoptosis of gonadotrophs to reduce or prevent secretion of luteinizing hormone and/or follicle stimulating hormone, decrease the level of a gonadal hormone (e.g., estrogen and/or testosterone) in the blood, and/or inhibit development of ovarian follicles or reduce or prevent sperm production of a subject. Optionally, the active agent(s) in the pharmaceutical formulation is present in an amount effective to induce the degeneration of ovarian follicles and/or terminate the estrous cycle in the mammal. Optionally, the active agent(s) in the pharmaceutical formulation is present in an amount effective to induce the degeneration of seminiferous tubules in a subject.

The pharmaceutical formulation may include pharmaceutically acceptable carriers and/or one or more pharmaceutically acceptable excipients. For example, the pharmaceutical formulation may be in the form of a liquid, such as a solution or a suspension, and contain a plurality of the disclosed nanoparticles in an aqueous medium and, optionally, one or more suitable excipients for the liquid formulation. Optionally, the pharmaceutical formulation is in a solid form, and contains a plurality of the disclosed nanoparticles and one or more suitable excipients for a solid formulation.

A. Carriers and Excipients

The pharmaceutical formulation contains one or more pharmaceutically acceptable carriers and/or excipients. Suitable pharmaceutically acceptable carriers and excipients are generally recognized as safe (GRAS), and may be administered to an individual without causing undesirable biological side effects or unwanted interactions.

Representative carriers and excipients include solvents (including buffers), diluents, pH modifying agents, preservatives, antioxidants, suspending agents, wetting agents, viscosity modifiers, tonicity agents, and stabilizing agents, and a combination thereof.

Nanoparticles for delivering active agents to the pituitary and/or ovaries or testes of the mammal can be dissolved or suspended in a suitable carrier to form a liquid pharmaceutical formulation, such as sterile saline, phosphate buffered saline (PBS), balanced salt solution (BSS), viscous gel, or other pharmaceutically acceptable carriers for administration. The pharmaceutical formulation may also be a sterile solution, suspension, or emulsion in a nontoxic, parenterally acceptable diluent or solvent.

Excipients can be added to a liquid or solid pharmaceutical formulation to assist in sterility, stability (e.g. shelf-life), integration, and to adjust and/or maintain pH or isotonicity of the nanoparticles in the pharmaceutical formulation, such as diluents, pH modifying agents, preservatives, antioxidants, suspending agents, wetting agents, viscosity modifiers, tonicity agents, and stabilizing agents, and a combination thereof.

B. Form

The pharmaceutical formulation containing a plurality of the disclosed nanoparticles can be in a liquid form or a solid form, as a liquid formulation or a solid formulation for oral administration or parenteral administration (e.g. intramuscular administration, intravenous administration, intraperitoneal administration, and subcutaneous administration) to a subject.

1. Oral Formulations

Optionally, the pharmaceutical formulation containing a plurality of the disclosed nanoparticles is in a form suitable for oral administration to a subject, such as a mammal (i.e. an oral formulation). Oral administration may involve swallowing, so that the nanoparticles encapsulating active agent(s) enter the gastrointestinal tract, or buccal or sublingual administration may be employed by which the nanoparticles encapsulating active agent(s) enter the blood stream directly from the mouth.

Formulations suitable for oral administration include solid formulations such as tablets, capsules containing particulates, liquids, powders, lozenges (including liquid-filled lozenges), chews, multi- and nano-particulates, gels, solid solutions, liposomes, films, ovules, sprays, and liquid formulations.

Liquid formulations for oral administration include suspensions, solutions, syrups, and elixirs. Such oral formulations may be employed as fillers in soft or hard capsules and can contain one or more suitable carriers and/or excipients, for example, water, ethanol, polyethylene glycol, propylene glycol, chitosan polymers and chitosan derivatives (e.g. N-trimethylene chloride chitosan, chitosan esters, chitosan modified with hydrophilic groups, such as amino groups, carboxyl groups, sulfate groups, etc.), methylcellulose, a suitable oil, one or more emulsifying agents, and/or suspending agents. Liquid formulations for oral administration may also be prepared by the reconstitution of a solid, for example, from a sachet.

Optionally, the nanoparticles are included in a fast-dissolving and/or fast-disintegrating dosage form.

For tablet or capsule dosage forms, in addition to the nanoparticles described herein, tablets generally contain disintegrants, binders, diluents, surface active agents, lubricants, glidants, antioxidants, colourants, flavouring agents, preservatives, or taste masking agents, or a combination thereof.

Examples of suitable disintegrants for forming a table or capsule dosage form containing the nanoparticles include, but are not limited to, sodium starch glycolate, sodium carboxymethyl cellulose, calcium carboxymethyl cellulose, croscarmellose sodium, crospovidone, polyvinylpyrrolidone, methyl cellulose, microcrystalline cellulose, lower alkyl-substituted hydroxypropyl cellulose, starch, pregelatinised starch and sodium alginate. Generally, the disintegrant can have a concentration in a range from about 1 wt % to about 25 wt %, from about 5 wt % to about 20 wt % of the tablet or capsule dosage form containing the nanoparticles.

Binders are generally used to impart cohesive qualities to a tablet formulation. Suitable binders for forming a tablet or capsule formulation containing the nanoparticles include, but are not limited to, microcrystalline cellulose, gelatin, sugars, polyethylene glycol, natural and synthetic gums, polyvinylpyrrolidone, pregelatinised starch, chitosan polymers and chitosan derivatives (e.g. N-trimethylene chloride chitosan, chitosan esters, chitosan modified with hydrophilic groups, such as amino groups, carboxyl groups, sulfate groups, etc.), hydroxypropyl cellulose, and hydroxypropyl methylcellulose.

Suitable diluents for forming a table or capsule formulation containing the nanoparticles include, but are not limited to, lactose (as, for example, the monohydrate, spray-dried monohydrate or anhydrous form), chitosan polymers and chitosan derivatives (e.g. N-trimethylene chloride chitosan, chitosan esters, chitosan modified with hydrophilic groups, such as amino groups, carboxyl groups, sulfate groups, etc.), N-sulfonated derivatives of chitosan, quaternarized derivatives of chitosan, carbosyalkylated chitosan, microcrystalline chitosan, mannitol, xylitol, dextrose, sucrose, sorbitol, microcrystalline cellulose, starch and dibasic calcium phosphate dihydrate.

Tablet or capsule formulations containing the nanoparticles may also contain surface active agents, such as sodium lauryl sulfate and polysorbate 80, and glidants such as silicon dioxide and talc. When present, surface active agents can have a concentration in a range from about 0.2 wt % to 5 wt % of the tablet or capsule formulation.

Tablet or capsule formulations containing the nanoparticles also generally contain lubricants, such as magnesium stearate, calcium stearate, zinc stearate, sodium stearyl fumarate, and mixtures of magnesium stearate with sodium lauryl sulphate. Lubricants can have a concentration in a range from about 0.25 wt % to 10 wt %, from about 0.5 wt % to about 3 wt % of the tablet or capsule formulation.

Other possible excipients included in a tablet or capsule formulation containing the nanoparticles include glidants (e.g. Talc or colloidal anhydrous silica at about 0.1 wt % to about 3 wt % of the table or capsule formulation), antioxidants, colourants, flavouring agents, preservatives and taste-masking agents. When present, glidants can have a concentration in a range from about 0.2 wt % to 1 wt % of the tablet or capsule formulation.

An exemplary tablet formulation contains up to about 80 wt % of the nanoparticles described herein, from about 10 wt % to about 90 wt % binder, from about 0 wt % to about 85 wt % diluent, from about 2 wt % to about 10 wt % disintegrant, and from about 0.25 wt % to about 10 wt % lubricant.

Tablet or capsule blends, including the nanoparticles and one or more suitable excipients, may be compressed directly or by roller to form tablets. Tablet or capsule blends or portions of the blends may alternatively be wet-, dry-, or melt-granulated, melt congealed, or extruded before tableting. The final table or capsule formulation may contain one or more layers and may be coated or uncoated; it may even be encapsulated in a particle, such as a polymeric particle or a liposomal particle.

Solid formulations containing the nanoparticles for oral administration may be formulated to be immediate and/or modified release. Modified release formulations include delayed, sustained, pulsed, controlled, targeted and programmed release formulations.

2. Parenteral Formulations

Optionally, the pharmaceutical formulation containing a plurality of the disclosed nanoparticles is in a form suitable for administration directly into the blood stream, into muscle, or into an internal organ. Suitable routes for such parenteral administration include intravenous, intraarterial, intraperitoneal, intrathecal, epidural, intracerebroventricular, intraurethral, intrasternal, intracranial, intramuscular, and subcutaneous delivery. Suitable means for parenteral administration include needle (including microneedle) injectors, needle-free injectors, and infusion techniques.

For example, the pharmaceutical formulation containing a plurality of the nanoparticles is in a form suitable for intramuscular administration, intravenous administration, intraperitoneal administration, or subcutaneous administration, or a combination thereof.

Parenteral formulations containing the nanoparticles described herein are typically aqueous solutions which can contain excipients such as salts, carbohydrates and buffering agents (e.g., from about pH 6.5 to about pH 8.0, from about pH 6.5 to about pH 7.4, from about pH 6.5 to about pH 7.0, from about pH 7.0 to pH 8.0, or from about pH 7.0 to about pH 7.4), but, for some applications, they may be more suitably formulated as a sterile aqueous solution or as a dried form to be used in conjunction with a suitable vehicle such as sterile, pyrogen-free water.

The liquid formulations containing the nanoparticles for parenteral administration may be a solution, a suspension, or an emulsion.

The liquid pharmaceutically acceptable carrier forming the parenteral formulation containing the nanoparticles can include one or more physiologically compatible buffers, such as a phosphate buffers. One skilled in the art can readily determine a suitable saline content and pH for an aqueous carrier for administration (e.g., from about pH 6.5 to about pH 8.0, from about pH 6.5 to about pH 7.4, from about pH 6.5 to about pH 7.0, from about pH 7.0 to pH 8.0, or from about pH 7.0 to about pH 7.4).

Liquid formulations containing the nanoparticles for parenteral administration may include one or more suspending agents, such as cellulose derivatives, sodium alginate, polyvinylpyrrolidone, gum tragacanth, or lecithin. The liquid formulations may also include one or more preservatives, such as ethyl or n-propyl p-hydroxybenzoate.

Optionally, the liquid formulation containing the nanoparticles contains one or more solvents that are low toxicity organic (i.e., nonaqueous) class 3 residual solvents, such as ethanol, acetone, ethyl acetate, tetrahydofuran, ethyl ether, and propanol, and a combination thereof. Any such solvents included in the liquid formulation should not detrimentally react with the one or more active agents present in the nanoparticles in the liquid formulation. Solvents such as freon, alcohol, glycol, polyglycol, or fatty acid, can also be included in the liquid formulation containing the nanoparticles as desired to increase the volatility of the solution or suspension.

Liquid formulations containing the nanoparticles for parenteral administration may also contain minor amounts of polymers, surfactants, or other pharmaceutically acceptable excipients known to those in the art. In this context, "minor amounts" means an amount that is sufficiently small to avoid adversely affecting uptake of the nanoparticles by the targeted cells, such as pituitary gonadotrophs.

The preparation of parenteral formulations containing the nanoparticles is typically under sterile conditions, for example, by lyophilisation, which can be accomplished using standard pharmaceutical techniques known to those skilled in the art.

Formulations for parenteral administration containing the nanoparticles may be formulated to provide immediate and/or modified release of the active agent. Modified release formulations include delayed, sustained, pulsed, controlled, targeted and programmed release formulations.

C. Dosage/wt % Concentration

The pharmaceutical formulation contains an effective amount of the active agent(s) encapsulated in the nanoparticles for non-surgical spaying or neutering. Typically, the active agent(s) is present in the pharmaceutical formulation in an effective amount to inactivate ribosomes of gonadotroph or induce apoptosis of gonadotrophs to reduce or prevent secretion of luteinizing and/or follicle stimulating hormone, decrease the level of a gonadal hormone (e.g. estrogen and/or testosterone) in the blood, and/or inhibit development of ovarian follicles or reduce or prevent sperm production of a subject, and thereby inactivate the ovaries or testes of the subject.

Optionally, the pharmaceutical formulation contains active agent(s) in an amount that is effective to decrease the level of a gonadal hormone (e.g. estrogen and/or testosterone) in the blood of a subject. Optionally, the pharmaceutical formulation contains active agent(s) in an effective amount to decrease the level of a gonadal hormone (e.g. estrogen and/or testosterone) in the blood of a subject by at least 30%, at least 35%, at least 40%, at least 45%, or at least 50% compared to the level of the gonadal hormone (e.g. estrogen and/or testosterone) in the blood of a control subject at the same stage of estrous/menstrual cycle. Optionally, the pharmaceutical formulation contains nanoparticles in an amount that is effective to decrease the level of a gonadal hormone (e.g. estrogen and/or testosterone) in the blood of a subject. Optionally, the pharmaceutical formulation contains nanoparticles in an effective amount to decrease the level of a gonadal hormone (e.g. estrogen and/or testosterone) in the blood of a subject by at least 30%, at least 35%, at least 40%, at least 45%, or at least 50% compared to the level of the gonadal hormone (e.g. estrogen and/or testosterone) in the blood of a control subject at the same stage of estrous/menstrual cycle.

A "control subject" as referred to herein, is a subject of the same species and sex as the subject being treated with the nanoparticles, but does not receive any treatment or is administered with a pharmaceutical carrier without the nanoparticles, such as a sterile saline or phosphate buffered saline (PBS).

For example, the pharmaceutical formulation contains active agent(s) in an amount that is effective to decrease the level of estrogen in the blood of a subject. Optionally, the pharmaceutical formulation contains active agent(s) in an effective amount to decrease the level of estrogen in the blood of a subject by at least 30%, at least 35%, at least 40%, at least 45%, or at least 50% compared to the level of estrogen in the blood of a control subject at the same stage of estrous cycle. For example, the pharmaceutical formulation contains nanoparticles in an amount that is effective to decrease the level of estrogen in the blood of a subject. Optionally, the pharmaceutical formulation contains nanoparticles in an effective amount to decrease the level of estrogen in the blood of a subject by at least 30%, at least 35%, at least 40%, at least 45%, or at least 50% compared to the level of estrogen in the blood of a control subject at the same stage of estrous cycle.

Optionally, the pharmaceutical formulation contains active agent(s) in an amount that is effective to induce the degeneration of ovarian follicles and/or terminate the estrous cycle in a subject. Optionally, the pharmaceutical formulation contains active agent(s) in an effective amount to degenerate ovarian follicles of the subject by at least 80%, at least 85%, at least 90%, at least 95%, or up to 100% compared to ovarian follicles of a control subject at the same stage of estrous cycle as shown by imaging. Optionally, the pharmaceutical formulation contains active agent(s) in an effective amount to terminate estrous cycle of the subject as shown by a state of constant estrous stage.

Optionally, the pharmaceutical formulation contains nanoparticles in an amount that is effective to induce the degeneration of ovarian follicles and/or terminate the estrous cycle in a subject. Optionally, the pharmaceutical formulation contains nanoparticles in an effective amount to degenerate ovarian follicles of the subject by at least 80%, at least 85%, at least 90%, at least 95%, or up to 100% compared to ovarian follicles of a control subject at the same stage of estrous cycle as shown by imaging. Optionally, the amount of nanoparticles is effective to terminate estrous cycle of the subject as shown by a state of constant estrous stage. Optionally, the pharmaceutical formulation contains nanoparticles in an effective amount to degenerate ovarian follicles of the subject by at least 80%, at least 85%, at least 90%, at least 95%, or up to 100% compared to ovarian follicles of a control subject at the same stage of estrous cycle as shown by imaging, and to terminate estrous cycle of the subject as shown by a state of constant estrous stage.

Optionally, the pharmaceutical formulation contains active agent(s) in an amount that is effective to induce the degeneration of seminiferous tubules in a subject. Optionally, the degeneration of a seminiferous tubule of the subject is indicated by a vacuolated spermatogonia, a lack of spermatocytes, and/or a lack of spermatids as shown by imaging. Optionally, the pharmaceutical formulation contains active agent(s) in an effective amount to degenerate seminiferous tubules of the subject by at least 80%, at least 85%, at least 90%, at least 95%, or up to 100% compared to seminiferous tubules of a control subject as shown by imaging. Optionally, the pharmaceutical formulation contains nanoparticles in an amount that is effective to induce the degeneration of seminiferous tubules in a subject. Optionally, the pharmaceutical formulation contains nanoparticles in an effective amount to degenerate seminiferous tubules of the subject by at least 80%, at least 85%, at least 90%, at least 95%, or up to 100% compared to seminiferous tubules of a control subject as shown by imaging.

The total concentration of the active agent(s) in the pharmaceutical formulation that is effective to inactivate ribosomes of gonadotroph or induce apoptosis of gonadotrophs to reduce or prevent secretion of luteinizing and/or follicle stimulating hormone, decrease the level of a gonadal hormone (e.g. estrogen and/or testosterone) in the blood, and/or induce the degeneration of ovarian follicles or reduce or prevent sperm production is typically in a range from about 0.000001 wt % to 20 wt %, from about 0.000005 wt % to 20 wt %, from about 0.00001 wt % to 20 wt %, from about 0.00005 wt % to 20 wt %, from about 0.0001 wt % to 20 wt %, from about 0.0005 wt % to 20 wt %, from about 0.001 wt % to 20 wt %, from about 0.000001 wt % to 10 wt %, from about 0.000005 wt % to 10 wt %, from about 0.00001 wt % to 10 wt %, from about 0.00005 wt % to 10 wt %, from about 0.0001 wt % to 10 wt %, from about 0.0005 wt % to 10 wt %, from about 0.001 wt % to 10 wt %, from about 0.000001 wt % to 5 wt %, from about 0.000005 wt % to 5 wt %, from about 0.00001 wt % to 5 wt %, from about 0.00005 wt % to 5 wt %, from about 0.0001 wt % to 5 wt %, from about 0.0005 wt % to 5 wt %, from about 0.001 wt % to 5 wt %, from about 0.000001 wt % to 2 wt %, from about 0.000005 wt % to 2 wt %, from about 0.00001 wt % to 2 wt %, from about 0.00005 wt % to 2 wt %, from about 0.0001 wt % to 2 wt %, from about 0.0005 wt % to 2 wt %, from about 0.001 wt % to 2 wt %, from about 0.000001 wt % to 0.5 wt %, from about 0.000005 wt % to 0.5 wt %, from about 0.00001 wt % to 0.5 wt %, from about 0.00005 wt % to 0.5 wt %, from about 0.0001 wt % to 0.5 wt %, from about 0.0005 wt % to 0.5 wt %, from about 0.001 wt % to 0.5 wt %, from about 0.000001 wt % to 0.2 wt %, from about 0.000005 wt % to 0.2 wt %, from about 0.00001 wt % to 0.2 wt %, from about 0.00005 wt % to 0.2 wt %, from about 0.0001 wt % to 0.2 wt %, from about 0.0005 wt % to 0.2 wt %, from about 0.001 wt % to 0.2 wt %, from about 0.000001 wt % to 0.05 wt %, from about 0.000005 wt % to 0.05 wt %, from about 0.00001 wt % to 0.05 wt %, from about 0.00005 wt % to 0.05 wt %, from about 0.0001 wt % to 0.05 wt %, from about 0.0005 wt % to 0.05 wt %, from about 0.001 wt % to 0.05 wt %, from about 0.000001 wt % to 0.02 wt %, from about 0.000005 wt % to 0.02 wt %, from about 0.00001 wt % to 0.02 wt %, from about 0.00005 wt % to 0.02 wt %, from about 0.0001 wt % to 0.02 wt %, from about 0.0005 wt % to 0.02 wt %, from about 0.001 wt % to 0.02 wt %, from about 0.000001 wt % to 0.005 wt %, from about 0.000005 wt % to 0.005 wt %, from about 0.00001 wt % to 0.005 wt %, from about 0.00005 wt % to 0.005 wt %, from about 0.0001 wt % to 0.005 wt %, from about 0.0005 wt % to 0.005 wt %, from about 0.000001 wt % to 0.002 wt %, from about 0.000005 wt % to 0.002 wt %, from about 0.00001 wt % to 0.002 wt %, from about 0.00005 wt % to 0.002 wt %, from about 0.0001 wt % to 0.002 wt %, or from about 0.0005 wt % to 0.002 wt %. The term "total concentration of the active agent(s) in the pharmaceutical formulation" refers to the sum of the weight of all active agent(s) encapsulated in the nanoparticles relative to the weight of the formulation.

For example, the total concentration of the active agent(s) in the pharmaceutical formulation that is effective to decrease the level of a gonadal hormone (e.g. estrogen and/or testosterone) in the blood of a subject by at least 30%, at least 35%, at least 40%, at least 45%, or at least 50% compared to the level of the gonadal hormone in the blood of a control subject at the same stage of estrous/menstrual cycle is in a range from about 0.000001 wt % to 20 wt %, from about 0.000005 wt % to 20 wt %, from about 0.00001 wt % to 20 wt %, from about 0.00005 wt % to 20 wt %, from about 0.0001 wt % to 20 wt %, from about 0.0005 wt % to 20 wt %, from about 0.001 wt % to 20 wt %, from about 0.000001 wt % to 10 wt %, from about 0.000005 wt % to 10 wt %, from about 0.00001 wt % to 10 wt %, from about 0.00005 wt % to 10 wt %, from about 0.0001 wt % to 10 wt %, from about 0.0005 wt % to 10 wt %, from about 0.001 wt % to 10 wt %, from about 0.000001 wt % to 5 wt %, from about 0.000005 wt % to 5 wt %, from about 0.00001 wt % to 5 wt %, from about 0.00005 wt % to 5 wt %, from about 0.0001 wt % to 5 wt %, from about 0.0005 wt % to 5 wt %, from about 0.001 wt % to 5 wt %, from about 0.000001 wt % to 2 wt %, from about 0.000005 wt % to 2 wt %, from about 0.00001 wt % to 2 wt %, from about 0.00005 wt % to 2 wt %, from about 0.0001 wt % to 2 wt %, from about 0.0005 wt % to 2 wt %, from about 0.001 wt % to 2 wt %, from about 0.000001 wt % to 0.5 wt %, from about 0.000005 wt % to 0.5 wt %, from about 0.00001 wt % to 0.5 wt %, from about 0.00005 wt % to 0.5 wt %, from about 0.0001 wt % to 0.5 wt %, from about 0.0005 wt % to 0.5 wt %, from about 0.001 wt % to 0.5 wt %, from about 0.000001 wt % to 0.2 wt %, from about 0.000005 wt % to 0.2 wt %, from about 0.00001 wt % to 0.2 wt %, from about 0.00005 wt % to 0.2 wt %, from about 0.0001 wt % to 0.2 wt %, from about 0.0005 wt % to 0.2 wt %, from about 0.001 wt % to 0.2 wt %, from about 0.000001 wt % to 0.05 wt %, from about 0.000005 wt % to 0.05 wt %, from about 0.00001 wt % to 0.05 wt %, from about 0.00005 wt % to 0.05 wt %, from about 0.0001 wt % to 0.05 wt %, from about 0.0005 wt % to 0.05 wt %, from about 0.001 wt % to 0.05 wt %, from about 0.000001 wt % to 0.02 wt %, from about 0.000005 wt % to 0.02 wt %, from about 0.00001 wt % to 0.02 wt %, from about 0.00005 wt % to 0.02 wt %, from about 0.0001 wt % to 0.02 wt %, from about 0.0005 wt % to 0.02 wt %, from about 0.001 wt % to 0.02 wt %, from about 0.000001 wt % to 0.005 wt %, from about 0.000005 wt % to 0.005 wt %, from about 0.00001 wt % to 0.005 wt %, from about 0.00005 wt % to 0.005 wt %, from about 0.0001 wt % to 0.005 wt %, from about 0.0005 wt % to 0.005 wt %, from about 0.000001 wt % to 0.002 wt %, from about 0.000005 wt % to 0.002 wt %, from about 0.00001 wt % to 0.002 wt %, from about 0.00005 wt % to 0.002 wt %, from about 0.0001 wt % to 0.002 wt %, or from about 0.0005 wt % to 0.002 wt %.

For example, the total concentration of the active agent(s) in the pharmaceutical formulation that is effective to decrease the estrogen level in the blood of the subject by at least 30%, at least 35%, at least 40%, at least 45%, or at least 50% compared to the estrogen level in the blood of a control subject at the same stage of estrous cycle is in a range from about 0.000001 wt % to 20 wt %, from about 0.000005 wt % to 20 wt %, from about 0.00001 wt % to 20 wt %, from about 0.00005 wt % to 20 wt %, from about 0.0001 wt % to 20 wt %, from about 0.0005 wt % to 20 wt %, from about 0.001 wt % to 20 wt %, from about 0.000001 wt % to 10 wt %, from about 0.000005 wt % to 10 wt %, from about 0.00001 wt % to 10 wt %, from about 0.00005 wt % to 10 wt %, from about 0.0001 wt % to 10 wt %, from about 0.0005 wt % to 10 wt %, from about 0.001 wt % to 10 wt %, from about 0.000001 wt % to 5 wt %, from about 0.000005 wt % to 5 wt %, from about 0.00001 wt % to 5 wt %, from about 0.00005 wt % to 5 wt %, from about 0.0001 wt % to 5 wt %, from about 0.0005 wt % to 5 wt %, from about 0.001 wt % to 5 wt %, from about 0.000001 wt % to 2 wt %, from about 0.000005 wt % to 2 wt %, from about 0.00001 wt % to 2 wt %, from about 0.00005 wt % to 2 wt %, from about 0.0001 wt % to 2 wt %, from about 0.0005 wt % to 2 wt %, from about 0.001 wt % to 2 wt %, from about 0.000001 wt % to 0.5 wt %, from about 0.000005 wt % to 0.5 wt %, from about 0.00001 wt % to 0.5 wt %, from about 0.00005 wt % to 0.5 wt %, from about 0.0001 wt % to 0.5 wt %, from about 0.0005 wt % to 0.5 wt %, from about 0.001 wt % to 0.5 wt %, from about 0.000001 wt % to 0.2 wt %, from about 0.000005 wt % to 0.2 wt %, from about 0.00001 wt % to 0.2 wt %, from about 0.00005 wt % to 0.2 wt %, from about 0.0001 wt % to 0.2 wt %, from about 0.0005 wt % to 0.2 wt %, from about 0.001 wt % to 0.2 wt %, from about 0.000001 wt % to 0.05 wt %, from about 0.000005 wt % to 0.05 wt %, from about 0.00001 wt % to 0.05 wt %, from about 0.00005 wt % to 0.05 wt %, from about 0.0001 wt % to 0.05 wt %, from about 0.0005 wt % to 0.05 wt %, from about 0.001 wt % to 0.05 wt %, from about 0.000001 wt % to 0.02 wt %, from about 0.000005 wt % to 0.02 wt %, from about 0.00001 wt % to 0.02 wt %, from about 0.00005 wt % to 0.02 wt %, from about 0.0001 wt % to 0.02 wt %, from about 0.0005 wt % to 0.02 wt %, from about 0.001 wt % to 0.02 wt %, from about 0.000001 wt % to 0.005 wt %, from about 0.000005 wt % to 0.005 wt %, from about 0.00001 wt % to 0.005 wt %, from about 0.00005 wt % to 0.005 wt %, from about 0.0001 wt % to 0.005 wt %, from about 0.0005 wt % to 0.005 wt %, from about 0.000001 wt % to 0.002 wt %, from about 0.000005 wt % to 0.002 wt %, from about 0.00001 wt % to 0.002 wt %, from about 0.00005 wt % to 0.002 wt %, from about 0.0001 wt % to 0.002 wt %, or from about 0.0005 wt % to 0.002 wt %.

For example, the total concentration of the active agent(s) in the pharmaceutical formulation that is effective to degenerate ovarian follicles of the subject by at least 80%, at least 85%, at least 90%, at least 95%, or up to 100% compared to ovarian follicles of a control subject at the same stage of estrous cycle as shown by imaging is in a range from about 0.000001 wt % to 20 wt %, from about 0.000005 wt % to 20 wt %, from about 0.00001 wt % to 20 wt %, from about 0.00005 wt % to 20 wt %, from about 0.0001 wt % to 20 wt %, from about 0.0005 wt % to 20 wt %, from about 0.001 wt % to 20 wt %, from about 0.000001 wt % to 10 wt %, from about 0.000005 wt % to 10 wt %, from about 0.00001 wt % to 10 wt %, from about 0.00005 wt % to 10 wt %, from about 0.0001 wt % to 10 wt %, from about 0.0005 wt % to 10 wt %, from about 0.001 wt % to 10 wt %, from about 0.000001 wt % to 5 wt %, from about 0.000005 wt % to 5 wt %, from about 0.00001 wt % to 5 wt %, from about 0.00005 wt % to 5 wt %, from about 0.0001 wt % to 5 wt %, from about 0.0005 wt % to 5 wt %, from about 0.001 wt % to 5 wt %, from about 0.000001 wt % to 2 wt %, from about 0.000005 wt % to 2 wt %, from about 0.00001 wt % to 2 wt %, from about 0.00005 wt % to 2 wt %, from about 0.0001 wt % to 2 wt %, from about 0.0005 wt % to 2 wt %, from about 0.001 wt % to 2 wt %, from about 0.000001 wt % to 0.5 wt %, from about 0.000005 wt % to 0.5 wt %, from about 0.00001 wt % to 0.5 wt %, from about 0.00005 wt % to 0.5 wt %, from about 0.0001 wt % to 0.5 wt %, from about 0.0005 wt % to 0.5 wt %, from about 0.001 wt % to 0.5 wt %, from about 0.000001 wt % to 0.2 wt %, from about 0.000005 wt % to 0.2 wt %, from about 0.00001 wt % to 0.2 wt %, from about 0.00005 wt % to 0.2 wt %, from about 0.0001 wt % to 0.2 wt %, from about 0.0005 wt % to 0.2 wt %, from about 0.001 wt % to 0.2 wt %, from about 0.000001 wt % to 0.05 wt %, from about 0.000005 wt % to 0.05 wt %, from about 0.00001 wt % to 0.05 wt %, from about 0.00005 wt % to 0.05 wt %, from about 0.0001 wt % to 0.05 wt %, from about 0.0005 wt % to 0.05 wt %, from about 0.001 wt % to 0.05 wt %, from about 0.000001 wt % to 0.02 wt %, from about 0.000005 wt % to 0.02 wt %, from about 0.00001 wt % to 0.02 wt %, from about 0.00005 wt % to 0.02 wt %, from about 0.0001 wt % to 0.02 wt %, from about 0.0005 wt % to 0.02 wt %, from about 0.001 wt % to 0.02 wt %, from about 0.000001 wt % to 0.005 wt %, from about 0.000005 wt % to 0.005 wt %, from about 0.00001 wt % to 0.005 wt %, from about 0.00005 wt % to 0.005 wt %, from about 0.0001 wt % to 0.005 wt %, from about 0.0005 wt % to 0.005 wt %, from about 0.000001 wt % to 0.002 wt %, from about 0.000005 wt % to 0.002 wt %, from about 0.00001 wt % to 0.002 wt %, from about 0.00005 wt % to 0.002 wt %, from about 0.0001 wt % to 0.002 wt %, or from about 0.0005 wt % to 0.002 wt %.

For example, the total concentration of the active agent(s) in the pharmaceutical formulation that is effective to terminate the estrous cycle of the subject as shown by a state of constant estrous stage is in a range from about 0.000001 wt % to 20 wt %, from about 0.000005 wt % to 20 wt %, from about 0.00001 wt % to 20 wt %, from about 0.00005 wt % to 20 wt %, from about 0.0001 wt % to 20 wt %, from about 0.0005 wt % to 20 wt %, from about 0.001 wt % to 20 wt %, from about 0.000001 wt % to 10 wt %, from about 0.000005 wt % to 10 wt %, from about 0.00001 wt % to 10 wt %, from about 0.00005 wt % to 10 wt %, from about 0.0001 wt % to 10 wt %, from about 0.0005 wt % to 10 wt %, from about 0.001 wt % to 10 wt %, from about 0.000001 wt % to 5 wt %, from about 0.000005 wt % to 5 wt %, from about 0.00001 wt % to 5 wt %, from about 0.00005 wt % to 5 wt %, from about 0.0001 wt % to 5 wt %, from about 0.0005 wt % to 5 wt %, from about 0.001 wt % to 5 wt %, from about 0.000001 wt % to 2 wt %, from about 0.000005 wt % to 2 wt %, from about 0.00001 wt % to 2 wt %, from about 0.00005 wt % to 2 wt %, from about 0.0001 wt % to 2 wt %, from about 0.0005 wt % to 2 wt %, from about 0.001 wt % to 2 wt %, from about 0.000001 wt % to 0.5 wt %, from about 0.000005 wt % to 0.5 wt %, from about 0.00001 wt % to 0.5 wt %, from about 0.00005 wt % to 0.5 wt %, from about 0.0001 wt % to 0.5 wt %, from about 0.0005 wt % to 0.5 wt %, from about 0.001 wt % to 0.5 wt %, from about 0.000001 wt % to 0.2 wt %, from about 0.000005 wt % to 0.2 wt %, from about 0.00001 wt % to 0.2 wt %, from about 0.00005 wt % to 0.2 wt %, from about 0.0001 wt % to 0.2 wt %, from about 0.0005 wt % to 0.2 wt %, from about 0.001 wt % to 0.2 wt %, from about 0.000001 wt % to 0.05 wt %, from about 0.000005 wt % to 0.05 wt %, from about 0.00001 wt % to 0.05 wt %, from about 0.00005 wt % to 0.05 wt %, from about 0.0001 wt % to 0.05 wt %, from about 0.0005 wt % to 0.05 wt %, from about 0.001 wt % to 0.05 wt %, from about 0.000001 wt % to 0.02 wt %, from about 0.000005 wt % to 0.02 wt %, from about 0.00001 wt % to 0.02 wt %, from about 0.00005 wt % to 0.02 wt %, from about 0.0001 wt % to 0.02 wt %, from about 0.0005 wt % to 0.02 wt %, from about 0.001 wt % to 0.02 wt %, from about 0.000001 wt % to 0.005 wt %, from about 0.000005 wt % to 0.005 wt %, from about 0.00001 wt % to 0.005 wt %, from about 0.00005 wt % to 0.005 wt %, from about 0.0001 wt % to 0.005 wt %, from about 0.0005 wt % to 0.005 wt %, from about 0.000001 wt % to 0.002 wt %, from about 0.000005 wt % to 0.002 wt %, from about 0.00001 wt % to 0.002 wt %, from about 0.00005 wt % to 0.002 wt %, from about 0.0001 wt % to 0.002 wt %, or from about 0.0005 wt % to 0.002 wt %.

For example, the total concentration of the active agent(s) in the pharmaceutical formulation that is effective to degenerate seminiferous tubules of the subject by at least 80%, at least 85%, at least 90%, at least 95%, or up to 100% compared to seminiferous tubules of a control as shown by imaging is in a range from about 0.000001 wt % to 20 wt %, from about 0.000005 wt % to 20 wt %, from about 0.00001 wt % to 20 wt %, from about 0.00005 wt % to 20 wt %, from about 0.0001 wt % to 20 wt %, from about 0.0005 wt % to 20 wt %, from about 0.001 wt % to 20 wt %, from about 0.000001 wt % to 10 wt %, from about 0.000005 wt % to 10 wt %, from about 0.00001 wt % to 10 wt %, from about 0.00005 wt % to 10 wt %, from about 0.0001 wt % to 10 wt %, from about 0.0005 wt % to 10 wt %, from about 0.001 wt % to 10 wt %, from about 0.000001 wt % to 5 wt %, from about 0.000005 wt % to 5 wt %, from about 0.00001 wt % to 5 wt %, from about 0.00005 wt % to 5 wt %, from about 0.0001 wt % to 5 wt %, from about 0.0005 wt % to 5 wt %, from about 0.001 wt % to 5 wt %, from about 0.000001 wt % to 2 wt %, from about 0.000005 wt % to 2 wt %, from about 0.00001 wt % to 2 wt %, from about 0.00005 wt % to 2 wt %, from about 0.0001 wt % to 2 wt %, from about 0.0005 wt % to 2 wt %, from about 0.001 wt % to 2 wt %, from about 0.000001 wt % to 0.5 wt %, from about 0.000005 wt % to 0.5 wt %, from about 0.00001 wt % to 0.5 wt %, from about 0.00005 wt % to 0.5 wt %, from about 0.0001 wt % to 0.5 wt %, from about 0.0005 wt % to 0.5 wt %, from about 0.001 wt % to 0.5 wt %, from about 0.000001 wt % to 0.2 wt %, from about 0.000005 wt % to 0.2 wt %, from about 0.00001 wt % to 0.2 wt %, from about 0.00005 wt % to 0.2 wt %, from about 0.0001 wt % to 0.2 wt %, from about 0.0005 wt % to 0.2 wt %, from about 0.001 wt % to 0.2 wt %, from about 0.000001 wt % to 0.05 wt %, from about 0.000005 wt % to 0.05 wt %, from about 0.00001 wt % to 0.05 wt %, from about 0.00005 wt % to 0.05 wt %, from about 0.0001 wt % to 0.05 wt %, from about 0.0005 wt % to 0.05 wt %, from about 0.001 wt % to 0.05 wt %, from about 0.000001 wt % to 0.02 wt %, from about 0.000005 wt % to 0.02 wt %, from about 0.00001 wt % to 0.02 wt %, from about 0.00005 wt % to 0.02 wt %, from about 0.0001 wt % to 0.02 wt %, from about 0.0005 wt % to 0.02 wt %, from about 0.001 wt % to 0.02 wt %, from about 0.000001 wt % to 0.005 wt %, from about 0.000005 wt % to 0.005 wt %, from about 0.00001 wt % to 0.005 wt %, from about 0.00005 wt % to 0.005 wt %, from about 0.0001 wt % to 0.005 wt %, from about 0.0005 wt % to 0.005 wt %, from about 0.000001 wt % to 0.002 wt %, from about 0.000005 wt % to 0.002 wt %, from about 0.00001 wt % to 0.002 wt %, from about 0.00005 wt % to 0.002 wt %, from about 0.0001 wt % to 0.002 wt %, or from about 0.0005 wt % to 0.002 wt %.

For example, the total concentration of the active agent(s) in the pharmaceutical formulation that is effective to degenerate ovarian follicles of the subject by at least 80%, at least 85%, at least 90%, at least 95%, or up to 100% compared to ovarian follicles of a control subject at the same stage of estrous cycle as shown by imaging and to terminate estrous cycle of the subject as shown by a state of constant estrous stage is in a range from about 0.000001 wt % to 20 wt %, from about 0.000005 wt % to 20 wt %, from about 0.00001 wt % to 20 wt %, from about 0.00005 wt % to 20 wt %, from about 0.0001 wt % to 20 wt %, from about 0.0005 wt % to 20 wt %, from about 0.001 wt % to 20 wt %, from about 0.000001 wt % to 10 wt %, from about 0.000005 wt % to 10 wt %, from about 0.00001 wt % to 10 wt %, from about 0.00005 wt % to 10 wt %, from about 0.0001 wt % to 10 wt %, from about 0.0005 wt % to 10 wt %, from about 0.001 wt % to 10 wt %, from about 0.000001 wt % to 5 wt %, from about 0.000005 wt % to 5 wt %, from about 0.00001 wt % to 5 wt %, from about 0.00005 wt % to 5 wt %, from about 0.0001 wt % to 5 wt %, from about 0.0005 wt % to 5 wt %, from about 0.001 wt % to 5 wt %, from about 0.000001 wt % to 2 wt %, from about 0.000005 wt % to 2 wt %, from about 0.00001 wt % to 2 wt %, from about 0.00005 wt % to 2 wt %, from about 0.0001 wt % to 2 wt %, from about 0.0005 wt % to 2 wt %, from about 0.001 wt % to 2 wt %, from about 0.000001 wt % to 0.5 wt %, from about 0.000005 wt % to 0.5 wt %, from about 0.00001 wt % to 0.5 wt %, from about 0.00005 wt % to 0.5 wt %, from about 0.0001 wt % to 0.5 wt %, from about 0.0005 wt % to 0.5 wt %, from about 0.001 wt % to 0.5 wt %, from about 0.000001 wt % to 0.2 wt %, from about 0.000005 wt % to 0.2 wt %, from about 0.00001 wt % to 0.2 wt %, from about 0.00005 wt % to 0.2 wt %, from about 0.0001 wt % to 0.2 wt %, from about 0.0005 wt % to 0.2 wt %, from about 0.001 wt % to 0.2 wt %, from about 0.000001 wt % to 0.05 wt %, from about 0.000005 wt % to 0.05 wt %, from about 0.00001 wt % to 0.05 wt %, from about 0.00005 wt % to 0.05 wt %, from about 0.0001 wt % to 0.05 wt %, from about 0.0005 wt % to 0.05 wt %, from about 0.001 wt % to 0.05 wt %, from about 0.000001 wt % to 0.02 wt %, from about 0.000005 wt % to 0.02 wt %, from about 0.00001 wt % to 0.02 wt %, from about 0.00005 wt % to 0.02 wt %, from about 0.0001 wt % to 0.02 wt %, from about 0.0005 wt % to 0.02 wt %, from about 0.001 wt % to 0.02 wt %, from about 0.000001 wt % to 0.005 wt %, from about 0.000005 wt % to 0.005 wt %, from about 0.00001 wt % to 0.005 wt %, from about 0.00005 wt % to 0.005 wt %, from about 0.0001 wt % to 0.005 wt %, from about 0.0005 wt % to 0.005 wt %, from about 0.000001 wt % to 0.002 wt %, from about 0.000005 wt % to 0.002 wt %, from about 0.00001 wt % to 0.002 wt %, from about 0.00005 wt % to 0.002 wt %, from about 0.0001 wt % to 0.002 wt %, or from about 0.0005 wt % to 0.002 wt %.

For example, the total concentration of the active agent(s) in the pharmaceutical formulation that is effective to degenerate seminiferous tubules of the subject by at least 80%, at least 85%, at least 90%, at least 95%, or up to 100% compared to seminiferous tubules of a control subject as shown by imaging is in a range from about 0.000001 wt % to 20 wt %, from about 0.000005 wt % to 20 wt %, from about 0.00001 wt % to 20 wt %, from about 0.00005 wt % to 20 wt %, from about 0.0001 wt % to 20 wt %, from about 0.0005 wt % to 20 wt %, from about 0.001 wt % to 20 wt %, from about 0.000001 wt % to 10 wt %, from about 0.000005 wt % to 10 wt %, from about 0.00001 wt % to 10 wt %, from about 0.00005 wt % to 10 wt %, from about 0.0001 wt % to 10 wt %, from about 0.0005 wt % to 10 wt %, from about 0.001 wt % to 10 wt %, from about 0.000001 wt % to 5 wt %, from about 0.000005 wt % to 5 wt %, from about 0.00001 wt % to 5 wt %, from about 0.00005 wt % to 5 wt %, from about 0.0001 wt % to 5 wt %, from about 0.0005 wt % to 5 wt %, from about 0.001 wt % to 5 wt %, from about 0.000001 wt % to 2 wt %, from about 0.000005 wt % to 2 wt %, from about 0.00001 wt % to 2 wt %, from about 0.00005 wt % to 2 wt %, from about 0.0001 wt % to 2 wt %, from about 0.0005 wt % to 2 wt %, from about 0.001 wt % to 2 wt %, from about 0.000001 wt % to 0.5 wt %, from about 0.000005 wt % to 0.5 wt %, from about 0.00001 wt % to 0.5 wt %, from about 0.00005 wt % to 0.5 wt %, from about 0.0001 wt % to 0.5 wt %, from about 0.0005 wt % to 0.5 wt %, from about 0.001 wt % to 0.5 wt %, from about 0.000001 wt % to 0.2 wt %, from about 0.000005 wt % to 0.2 wt %, from about 0.00001 wt % to 0.2 wt %, from about 0.00005 wt % to 0.2 wt %, from about 0.0001 wt % to 0.2 wt %, from about 0.0005 wt % to 0.2 wt %, from about 0.001 wt % to 0.2 wt %, from about 0.000001 wt % to 0.05 wt %, from about 0.000005 wt % to 0.05 wt %, from about 0.00001 wt % to 0.05 wt %, from about 0.00005 wt % to 0.05 wt %, from about 0.0001 wt % to 0.05 wt %, from about 0.0005 wt % to 0.05 wt %, from about 0.001 wt % to 0.05 wt %, from about 0.000001 wt % to 0.02 wt %, from about 0.000005 wt % to 0.02 wt %, from about 0.00001 wt % to 0.02 wt %, from about 0.00005 wt % to 0.02 wt %, from about 0.0001 wt % to 0.02 wt %, from about 0.0005 wt % to 0.02 wt %, from about 0.001 wt % to 0.02 wt %, from about 0.000001 wt % to 0.005 wt %, from about 0.000005 wt % to 0.005 wt %, from about 0.00001 wt % to 0.005 wt %, from about 0.00005 wt % to 0.005 wt %, from about 0.0001 wt % to 0.005 wt %, from about 0.0005 wt % to 0.005 wt %, from about 0.000001 wt % to 0.002 wt %, from about 0.000005 wt % to 0.002 wt %, from about 0.00001 wt % to 0.002 wt %, from about 0.00005 wt % to 0.002 wt %, from about 0.0001 wt % to 0.002 wt %, or from about 0.0005 wt % to 0.002 wt %.

The pharmaceutical formulation containing a plurality of the nanoparticles is optionally provided in a unit dosage form. The dosage of the nanoparticles in the pharmaceutical formulation in the unit dosage form can be in a range from about 0.01 mg to about 100 mg, from about 0.01 mg to about 90 mg, from about 0.01 mg to about 80 mg, from about 0.01 mg to about 60 mg, from about 0.01 mg to about 50 mg, from about 0.01 mg to about 30 mg, from about 0.01 mg to about 20 mg, from about 0.01 mg to about 10 mg, from about 0.1 mg to about 100 mg, from about 0.2 mg to about 100 mg, from about 0.3 mg to about 100 mg, from about 0.5 mg to about 100 mg, from about 1 mg to about 100 mg, from about 0.3 mg to about 90 mg, from about 0.3 mg to about 80 mg, from about 0.3 mg to about 60 mg, from about 0.3 mg to about 50 mg, from about 0.3 mg to about 30 mg, from about 0.2 mg to about 20 mg, or from about 0.1 mg to about 10 mg.

The pharmaceutical formulation containing a plurality of the nanoparticles is optionally provided in a unit dosage form. The dosage of the active agents in the pharmaceutical formulation in the unit dosage form can be in a range from about $5\times10^{-5}$ μg to about 0.5 μg, from about $5\times10^{-5}$ μg to about 0.1 μg, from about $5\times10^{-5}$ μg to about 0.01 μg, from about $5\times10^{-5}$ μg to about 0.005 μg, from about $5\times10^{-5}$ μg to about 0.001 μg, from about $5\times10^{-5}$ μg to about $5\times10^{-4}$ μg, from about $1\times10^{-4}$ μg to about 0.5 μg, from about $5\times10^{-4}$ μg to about 0.5 μg, from about 0.001 μg to about 0.5 μg, or from about 0.01 μg to about 0.5 μg.

III. Methods of Using the Nanoparticles

A. Non-Surgical Sterilization

Methods for non-surgical sterilization of a subject using the nanoparticles are disclosed.

Generally, the method for non-surgically sterilizing a subject in need thereof includes administering to the subject a pharmaceutical formulation containing a plurality of the nanoparticles described above. The pharmaceutical formulation is administered to a subject in an effective amount to inactivate the ovaries or testes of the subject. For example, the pharmaceutical formulation is administered to a subject in an amount effective to decrease the level of a gonadal hormone (e.g. estrogen and/or testosterone) in the blood, induce the degeneration of ovarian follicles, and/or terminate the estrous cycle in the subject. For example, the pharmaceutical formulation is administered to a subject in an amount effective to decrease the level of a gonadal hormone (e.g. estrogen and/or testosterone) in the blood and/or induce the degeneration of seminiferous tubules in the subject. The step of administering an effective amount of the pharmaceutical formulation can be achieved in a single administration step or using multiple steps of administering the pharmaceutical formulation.

The subject can be a mammal, such as a human, a dog, a cat, a rat, a monkey, rabbits, guinea pigs, etc., that is in need of sterilization. The mammal can be a female or a male.

The pharmaceutical formulation containing a plurality of the nanoparticles can be administered by oral administration, intramuscular administration, intravenous administration, intraperitoneal administration, or subcutaneous administration, or a combination thereof.

1. Administering an Effective Amount of the Pharmaceutical Formulation

The step of administering an effective amount of the pharmaceutical formulation can be achieved in a single administration step or using multiple steps of administering the pharmaceutical formulation. Optionally, the step of administering the pharmaceutical formulation is repeated more than one time, and following all of the steps of administering the formulation, an effective amount of the formulation is administered. For example, if the unit dosage form contains an effective amount of the active agent(s) to inactivate the ovaries or testes of the subject, then the method only requires a single administration step. Alternatively, if the unit dosage form contains less than the required effective amount of the active agent(s) to inactivate the ovaries or testes of the subject, then the method involves at least two steps of administering the pharmaceutical formulation, and optionally more than two steps of administering the pharmaceutical formulation to the subject until an effective amount of the pharmaceutical formulation is administered to the subject to inactivate the ovaries or testes of the subject. When multiple administration steps are needed to administer an effective amount of the pharmaceutical formulation to the patient, each administration step may involve administering the same dosage or different dosages of the pharmaceutical formulation to the patient. In a preferred embodiment, the method involves a single administration of the pharmaceutical formulation in an effective amount to inactivate the ovaries or testes of the subject.

The pharmaceutical formulation is administered to the subject in an amount effective to inactivate ribosomes of gonadotroph or induce apoptosis of gonadotrophs to reduce or prevent secretion of luteinizing and/or follicle stimulating hormone, decrease the level of a gonadal hormone (e.g. estrogen and/or testosterone) in the blood, and/or inhibit development of ovarian follicles or reduce or prevent sperm production, and thereby inactive ovaries or testes, optionally without significant side effects, such as internal bleeding, infection, and/or other side effects associated with surgery and general anesthesia.

Optionally, the pharmaceutical formulation is administered to the subject in an effective amount to block estrous cycles in the subject. Optionally, the pharmaceutical formulation is administered to the subject in an effective amount to inhibit development of follicles and/or ovulation in the subject. Optionally, the pharmaceutical formulation is administered to the subject in an effective amount to block estrous cycles and to inhibit development of follicles and/or ovulation in the subject. Optionally, the pharmaceutical formulation is administered to the subject in an effective amount to block estrous cycles and/or to inhibit development of follicles and/or ovulation in the subject, without one or more significant side effects, such as internal bleeding, infection, and/or other side effects associated with surgery and general anesthesia.

For example, the pharmaceutical formulation is administered to the subject in an effective amount to induce the degeneration of ovarian follicles and/or terminate the estrous cycle in the subject.

For example, the pharmaceutical formulation is administered to the subject in an effective amount to induce degeneration of ovarian follicles in the subject. Optionally, the degeneration of ovarian follicles occurs within about 8 days, within about 10 days, within about 12 days, within about 14 days, or within about 1 month following the step of administration of the pharmaceutical formulation.

For example, the pharmaceutical formulation is administered to the subject in an effective amount to degenerate ovarian follicles of the subject by at least 80%, at least 85%, at least 90%, at least 95%, or up to 100% compared to ovarian follicles of a control subject at the same stage of estrous cycle. Optionally, the ovarian follicles of the subject are degenerated by at least 80%, at least 85%, at least 90%, at least 95%, or up to 100%, within about 8 days, within about 10 days, within about 12 days, within about 14 days, or within about 1 month following administration of the pharmaceutical formulation compared to ovarian follicles of a control subject at the same stage of estrous cycle, as shown by imaging, such as using the imaging technique described in Myers, et al., *Reproduction Research,* 127:569-580 (2004).

For example, the pharmaceutical formulation is administered to the subject in an effective amount to terminate the estrous cycle of the subject as shown by a state of constant estrous stage. Optionally, the termination of estrous cycle of the subject occurs within about 8 days, within about 10 days, within about 12 days, within about 14 days, or within about 1 month following administration of the pharmaceutical formulation.

For example, the pharmaceutical formulation is administered to the subject in an effective amount to induce the degeneration of ovarian follicles and to terminate the estrous cycle in the subject within about 8 days, within about 10 days, within about 12 days, within about 14 days, or within about 1 month following administration of the pharmaceutical formulation.

For example, the pharmaceutical formulation is administered to the subject in an effective amount to induce the degeneration of seminiferous tubules in the subject, optionally without one or more significant side effects, such as internal bleeding, infection, and/or other side effects associated with surgery and general anesthesia. Optionally, the degeneration of seminiferous tubules occurs within about 8 days, within about 10 days, within about 12 days, within about 14 days, or within about 1 month following the step of administration of the pharmaceutical formulation.

For example, the pharmaceutical formulation is administered to the subject in an effective amount to degenerate seminiferous tubules of the subject by at least 80%, at least 85%, at least 90%, at least 95%, or up to 100% compared to seminiferous tubules of a control subject. Optionally, the seminiferous tubules of the subject are degenerated by at least 80%, at least 85%, at least 90%, at least 95%, or up to 100%, within about 8 days, within about 10 days, within about 12 days, within about 14 days, or within about 1 month following administration of the pharmaceutical formulation compared to seminiferous tubules of a control subject, as shown by imaging.

Optionally, the concentration of nanoparticles in the pharmaceutical formulation that is administered to the subject to induce the degeneration of ovarian follicles and/or terminate estrous cycle in the subject is in a range from about 0.1 µg to about 100 µg, from about 0.5 µg to about 50 µg, from about 1 µg to about 100 µg, from about 1 µg to about 50 µg, from about 1 µg to about 25 µg, from about 1 µg to about 10 µg, from about 1 µg to about 5 µg, from about 1 µg to about 4 µg, from about 2 µg to about 100 µg, from about 2 µg to about 50 µg, from about 2 µg to about 25 µg, from about 2 µg to about 10 µg, from about 2 µg to about 5 µg, from about 2 µg to about 10 µg, or from about 2 µg to about 4 µg per g of the subject.

For example, the concentration of nanoparticles in the pharmaceutical formulation administered to the subject to induce the degeneration of ovarian follicles and/or terminate estrous cycle in the subject is in a range from about 2 µg to about 10 µg, from about 2 µg to about 4 µg, or from about 4 µg to about 10 µg per g of the subject.

Optionally, the concentration of nanoparticles in the pharmaceutical formulation that is administered to the subject to induce the degeneration of seminiferous tubules in the subject is in a range from about 0.1 µg to about 100 µg, from about 0.5 µg to about 50 µg, from about 1 µg to about 100 µg, from about 1 µg to about 50 µg, from about 1 µg to about 25 µg, from about 1 µg to about 10 µg, from about 1 µg to about 5 µg, from about 4 µg to about 10 µg, from about 1 µg to about 4 µg, from about 2 µg to about 100 µg, from about 2 µg to about 50 µg, from about 2 µg to about 25 µg, from about 2 µg to about 10 µg, from about 2 µg to about 5 µg, from about 2 µg to about 10 µg, or from about 2 µg to about 4 µg per g of the subject.

For example, the concentration of nanoparticles in the pharmaceutical formulation administered to the subject to induce the degeneration of seminiferous tubules in the subject is in a range from about 0.5 µg to about 10 µg, from about 1 µg to about 5 µg, or from about 2 µg to about 5 µg per g of the subject.

The disclosed nanoparticles, pharmaceutical formulations, and methods of using can be further understood through the following enumerated paragraphs.

1. A plurality of nanoparticles for sterilization, wherein the nanoparticles comprise
   a cage,
   a surface modifying agent,
   a targeting ligand, and
   an active agent,
   wherein the surface modifying agent is attached to an outer surface of the cage and wherein the targeting ligand is exposed to a surrounding environment, and
   wherein the active agent is encapsulated in the cage.

2. The plurality of nanoparticles of paragraph 1, wherein the cage is a zeolitic imidazolate framework ("ZIF"), and wherein the ZIF comprises a metal ion selected from the group consisting of $Zn^+$, $Zn^{2+}$, $Pd^{2+}$, $Pd^{4+}$, $Pt^{2+}$, $Pt^{4+}$, $Ni^+$, $Ni^{2+}$, $Ni^{3+}$, $Mn^{2+}$, $Mn^{3+}$, $Mn^{4+}$, $Mn^{6+}$, $Mn^{7+}$, $Co^{2+}$, $Co^{3+}$, $Cu^{2+}$, $Cd^{2+}$, $Fe^{2+}$, $Fe^{3+}$, and $Ti^{4+}$.

3. The plurality of nanoparticles of paragraph 2, wherein the ZIF comprises imidazolate functionalized with amine, hydroxyl, thiol, aldehyde, or carboxyl, or a combination thereof.

4. The plurality of nanoparticles of paragraph 2 or 3, wherein the ZIF is ZIF-2, ZIF-3, ZIF-4, ZIF-8, ZIF-10, ZIF-11, ZIF-12, ZIF-14, ZIF-20, ZIF-21, ZIF-60, ZIF-61, ZIF-62, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-81, ZIF-82, ZIF-90, ZIF-91, ZIF-92, ZIF-95, or ZIF-100.

5. The plurality of nanoparticles of any one of paragraphs 1-4, wherein at least 20 wt % (weight of the surface modifying agent conjugated to the targeting ligand/total weight of the surface modifying agent attached to the cage), at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, in a range from 20 wt % to 100 wt %, from 30 wt % to 100 wt %, or from 40 wt % to 100 wt % of the surface modifying agent is conjugated to the targeting ligand.

6. The plurality of nanoparticles of any one of paragraphs 1-5, wherein the end of the surface modifying agent that is attached to the cage comprises a chemical moiety containing one or more negative charges.

7. The plurality of nanoparticles of paragraph 6, wherein the chemical moiety is folate, L-methylfolate, or glutamate, or a combination thereof.

8. The plurality of nanoparticles of any one of paragraphs 1-7, wherein the surface modifying agent comprises a polymer backbone selected from the group consisting of polyalkylene glycol, polylactic acid, polyglycolic acid, poly(lactic-co-glycolic acid), polyanhydrides, poly(ortho)esters, polyurethanes, poly(butyric acid), poly(valeric acid), poly(lactide-coaprolactone), and polyethylenimine, and a copolymer thereof.

9. The plurality of nanoparticles of paragraph 8, wherein the polymer backbone of the surface modifying agent is polyethylene glycol.

10. The plurality of nanoparticles of paragraph 8 or 9, wherein the polymer backbone has a molecular weight in a range from about 1 kDa to about 10 kDa, from about 2 kDa to about 10 kDa, from about 3 kDa to about 10 kDa, from about 4 kDa to about 10 kDa, from about 1 kDa to about 9 kDa, from about 2 kDa to about 9 kDa, from about 3 kDa to about 9 kDa, from about 4 kDa to about 9 kDa, from about 1 kDa to about 8 kDa, from about 2 kDa to about 8 kDa, from about 3 kDa to about 8 kDa, from about 4 kDa to about 8 kDa, from about 1 kDa to about 7 kDa, from about 2 kDa to about 7 kDa, from about 3 kDa to about 7 kDa, from about 4 kDa to about 7 kDa, from about 1 kDa to about 6 kDa, from about 2 kDa to about 6 kDa, from about 3 kDa to about 6 kDa, or from about 4 kDa to about 6 kDa.

11. The plurality of nanoparticles of any one of paragraphs 1-10 having an average diameter in a range from about 10 nm to about 100 nm, from about 10 nm to about 90 nm, from about 10 nm to about 80 nm, from about 20 nm to about 100 nm, from about 20 nm to about 90 nm, from about 20 nm to about 80 nm, from about 30 nm to about 100 nm, from about 30 nm to about 90 nm, or from about 30 nm to about 80 nm.

12. The plurality of nanoparticles of any one of paragraphs 1-11, wherein the surface density of the surface modifying agent ("SMA") on the surface of the nanoparticle is at least 1 SMA/nm$^2$, at least 5 SMA/nm$^2$, at least 7 SMA/nm$^2$, at least 10 SMA/nm$^2$, at least 15 SMA/nm$^2$, at least 20 SMA/nm$^2$, at least 25 SMA/nm$^2$, at least 30 SMA/nm$^2$, at least 35 SMA/nm$^2$, at least 40 SMA/nm$^2$, at least 45 SMA/nm$^2$, or at least 50 SMA/nm$^2$.

13. The plurality of nanoparticles of any one of paragraphs 1-12, wherein the targeting ligand is a gonadotropin-releasing hormone ("GnRH") agonist, a follicle stimulating hormone ("FSH") receptor agonist, or a luteinizing hormone ("LH") receptor agonist, or a combination thereof.

14. The plurality of nanoparticles of any one of paragraphs 1-13, wherein the targeting ligand is selected from the group consisting of buserelin, azagly-naflorein, deslorelin, fertirelin, gonadorelin, goserelin, histrelin, lecirelin, leuprorelin, nafarelin, peforelin, peforelin acetate, triptorelin, leuprolide, leuprolide acetate, abarelix, cetorelix, degarelix, elagolix, ganirelix, linzagolix, relugolix, thiazolidinone compound 5, hexahydroquinoline derivative Org 214444-0, thienopyrimidine derivatives, such as thienopyrimidine derivative Org 43553, 5-amino-N-(tert-butyl)-4-(3-(isonicotinamido)phenyl)-2-(methylthio)thieno-[2,3-d]pyrimidine-6-carboxamide, 5-amino-N-(tert-butyl)-2-(methylthio)-4-(3-(thiophene-3-carboxamido)phenyl thieno[2,3-d]pyrimidine-6-carboxamide, 5-amino-N-(tert-butyl-2-(methylsulfonyl)-4-(3-(nicotinamido)phenyl)thieno[2,3-d]pyrimidine-6-carboxamide, 5-amino-N-(tert-butyl-4-(3-(1-methyl-1H-pyrazole-4-carboxamido)phenyl)-2-(methylsulfanyl)thieno[2,3-d]pyrimidine-6-carboxamide, 5-amino-N-(tert-butyl)-4-(3-(2-metoxynicotinamido)phenyl)-2-(methylthio)thieno[2,3-d]pyrimidine-6-carboxamide, 4-((3-(5-amino-6-(tert-butylcarbamoyl)-2-(methylthio)thieno[2,3-d]pyrimidine-4-il)phenyl)carbamoyl)pyridine 1-oxide, and 5-amino-N-(tert-butyl)-4-(3-(2-chloronicotinamido)phenyl)-2-(methylthio)thieno[2,3-d]pyrimidine-6-carboxamide; diketopiperazines, and m-dihydropyridine, or a combination thereof.

15. The plurality of nanoparticles of any one of paragraphs 1-14, wherein the targeting ligand is buserelin.

16. The plurality of nanoparticles of any one of paragraphs 1-15, wherein the active agent is a ribosome inactivating protein, an apoptosis inducer, a hormone, a receptor ligand, or a nucleic acid, or a combination thereof.

17. The plurality of nanoparticles of any one of paragraphs 1-16, wherein the active agent is saporin, gelonin, a pokeweed antiviral protein, or an apoptosis inducer, or a combination thereof.

18. The plurality of nanoparticles of any one of paragraphs 1-17, wherein one or more of the nanoparticles further comprise a dye encapsulated in the nanoparticle.

19. A pharmaceutical formulation comprising
   the plurality of nanoparticles of any one of paragraphs 1-18 and
   a pharmaceutically acceptable carrier and/or excipient.

20. The pharmaceutical formulation of paragraph 19, wherein the pharmaceutical formulation comprises an effective amount of the nanoparticles to decrease the level of a gonadal hormone in the blood, induce degeneration of ovarian follicles, and/or terminate estrous cycle of a subject.

21. The pharmaceutical formulation of paragraph 20, wherein the effective amount of the nanoparticles is effective to decrease the level of the gonadal hormone in the blood of the subject by at least 30%, at least 35%, at least 40%, at least 45%, or at least 50% compared to the level of the gonadal hormone in the blood of a control subject at the same stage of estrous cycle.

22. The pharmaceutical formulation of paragraph 20 or 21, wherein the effective amount of the nanoparticles is effective to degenerate ovarian follicles of the subject by at least 80%, at least 85%, at least 90%, at least 95%, or up to 100% compared to ovarian follicles of a control subject at the same stage of estrous cycle as shown by imaging.

23. The pharmaceutical formulation of any one of paragraphs 20-22, wherein the effective amount of the nanoparticles is effective to terminate estrous cycle of the subject as shown by a state of constant estrous stage.

24. The pharmaceutical formulation of paragraph 19, wherein the pharmaceutical formulation comprises an effective amount of the nanoparticles to decrease the level of a gonadal hormone in the blood and/or induce the degeneration of seminiferous tubules in a subject.

25. The pharmaceutical formulation of paragraph 24, wherein the effective amount of the nanoparticles is effective to decrease the level of the gonadal hormone in the blood of the subject by at least 30%, at least 35%, at least 40%, at least 45%, or at least 50% compared to the level of the gonadal hormone in the blood of a control subject at the same stage of menstrual cycle.

26. The pharmaceutical formulation of paragraph 24 or 25, wherein the effective amount of the nanoparticles is effective to degenerate seminiferous tubules of the subject by at least 80%, at least 85%, at least 90%, at least 95%, or up to 100% compared to seminiferous tubules of a control subject as shown by imaging.

27. The pharmaceutical formulation of any one of paragraphs 20-26, wherein the gonadal hormone is estrogen or testosterone, or a combination thereof.

28. The pharmaceutical formulation of any one of paragraphs 19-27, wherein the concentration of the active agent in the pharmaceutical formulation is in a range from about 0.000001 wt % to 20 wt %, from about 0.00001 wt % to 20 wt %, from about 0.0001 wt % to 20 wt %, from about 0.001 wt % to 20 wt %, from about 0.000001 wt % to 2 wt %, from about 0.00001 wt % to 2 wt %, from about 0.0001 wt % to 2 wt %, from about 0.001 wt % to 2 wt %, from about 0.000001 wt % to 0.2 wt %, from about 0.00001 wt % to 0.2 wt %, from about 0.0001 wt % to 0.2 wt %, from about 0.001 wt % to 0.2 wt %, from about 0.000001 wt % to 0.02 wt %, from about 0.00001 wt % to 0.02 wt %, from about 0.0001 wt % to 0.02 wt %, from about 0.001 wt % to 0.02 wt %, from about 0.000001 wt % to 0.002 wt %, from about 0.00001 wt % to 0.002 wt %, or from about 0.0001 wt % to 0.002 wt %.

29. The pharmaceutical formulation of any one of paragraphs 19-28, wherein the pharmaceutical formulation is in a unit dosage form, and wherein the dosage of the active agent is in a range from about $5 \times 10^{-5}$ µg to about 0.5 µg, from about $5 \times 10^{-5}$ µg to about 0.1 µg, from about $5 \times 10^{-5}$ µg to about 0.01 µg, from about $5 \times 10^{-5}$ µg to about 0.005 µg, from about $5 \times 10^{-5}$ µg to about 0.001 µg, from about $5 \times 10^{-5}$ µg to about $5 \times 10^{-4}$ µg, from about $1 \times 10^{-4}$ µg to about 0.5 µg, from about $5 \times 10^{-4}$ µg to about 0.5 µg, from about 0.001 µg to about 0.5 µg, or from about 0.01 µg to about 0.5 µg.

30. The pharmaceutical formulation of any one of paragraphs 19-29, wherein the pharmaceutical formulation is in a form suitable for oral administration, intramuscular administration, intravenous administration, intraperitoneal administration, or subcutaneous administration, or a combination thereof.

31. A method for sterilizing a subject in need thereof comprising
   (i) administering to the subject the pharmaceutical formulation of any one of paragraphs 19 to 25, wherein step (i) occurs one or more times.

32. The method of paragraph 31, wherein the method comprises only a single administration of the pharmaceutical formulation, wherein the pharmaceutical formulation comprises an effective amount of the nanoparticles to decrease the level of a gonadal hormone in the blood, induce the degeneration of ovarian follicles, and/or terminate the estrous cycle in a subject.

33. The method of paragraph 31, wherein the method comprises more than one step of administering to the subject the pharmaceutical formulation, wherein following all of the administration steps an effective amount of the nanoparticles to decrease the level of a gonadal hormone in the blood, induce the degeneration of ovarian follicles, and/or terminate the estrous cycle in a subject is administered to the subject.

34. The method of paragraph 32, wherein the decrease of the level of the gonadal hormone in the blood, degeneration of ovarian follicles, and/or termination of estrous cycle of the subject, occurs within about 8 days, within about 10 days, within about 12 days, within about 14 days, or within about 1 month following step (i).

35. The method of paragraph 33, wherein the decrease of the level of the gonadal hormone in the blood, degeneration of ovarian follicles, and/or termination of estrous cycle of the subject, occurs within about 8 days, within about 10 days, within about 12 days, within about 14 days, or within about 1 month following the final step of administering the pharmaceutical formulation.

36. The method of any one of paragraphs 32-35, wherein the level of the gonadal hormone in the blood of the subject is decreased by at least 30%, at least 35%, at least 40%, at least 45%, or at least 50% compared to the level of the gonadal hormone in the blood of a control subject at the same stage of estrous cycle, following step (i) or the final step of administering the pharmaceutical formulation.

37. The method of any one of paragraphs 32-36, wherein the ovarian follicles of the subject is degenerated by at least 80%, at least 85%, at least 90%, at least 95%, or up to 100% compared to ovarian follicles of a control subject at the same stage of estrous cycle as shown by imaging, following step (i) or the final step of administering the pharmaceutical formulation.

38. The method of any one of paragraphs 32-37, wherein the estrous cycle of the subject is terminated as shown by a state of constant estrous stage, following step (i) or the final step of administering the pharmaceutical formulation.

39. The method of paragraph 31, wherein the method comprises only a single administration of the pharmaceutical formulation, wherein the pharmaceutical formulation comprises an effective amount of the nanoparticles to decrease the level of a gonadal hormone in the blood and/or induce the degeneration of seminiferous tubules in a subject.

40. The method of paragraph 31, wherein the method comprises more than one step of administering to the subject the pharmaceutical formulation, wherein following all of the administration steps an effective amount of the nanoparticles to decrease the level of a gonadal hormone in the blood and/or induce the degeneration of seminiferous tubules in the subject, is administered to the subject.

41. The method of paragraph 39, wherein the decrease of the level of the gonadal hormone in the blood and/or degeneration of seminiferous tubules of the subject, occurs within about 8 days, within about 10 days, within about 12 days, within about 14 days, or within about 1 month following step (i).

42. The method of paragraph 40, wherein the decrease of the level of the gonadal hormone in the blood and/or degeneration of seminiferous tubules of the subject, occurs within about 8 days, within about 10 days, within about 12 days, within about 14 days, or within about 1 month following the final step of administering the pharmaceutical formulation.

43. The method of any one of paragraphs 39-42, wherein the level of the gonadal hormone in the blood of the subject is decreased by at least 30%, at least 35%, at least 40%, at least 45%, or at least 50% compared to the level of the gonadal hormone in the blood of a control subject at the same stage of menstrual cycle, following step (i) or the final step of administering the pharmaceutical formulation.

44. The method of any one of paragraphs 39-43, wherein the ovarian follicles of the subject is degenerated by at least 80%, at least 85%, at least 90%, at least 95%, or up to 100% compared to ovarian follicles of a control subject at the same stage of menstrual cycle as shown by imaging, following step (i) or the final step of administering the pharmaceutical formulation.

45. The method of any one of paragraphs 32-44, wherein the gonadal hormone is estrogen or testosterone, or a combination thereof.

46. The method of any one of paragraphs 31 to 45, wherein the subject is a mammal.

47. The method of any one of paragraphs 31 to 46, wherein in step (i) the formulation is administered by oral administration, intramuscular administration, intravenous administration, intraperitoneal administration, or subcutaneous administration, or a combination thereof.

48. The method of any one of paragraphs 31 to 47, wherein during step (i), the dosage of the nanoparticles in the pharmaceutical formulation is from about 0.1 µg to about 100 µg, from about 0.5 µg to about 50 µg, from about 1 µg to about 100 µg, from about 2 µg to about 100 µg, from about 2 µg to about 50 µg, from about 2 µg to about 25 µg, from about 2 µg to about 10 µg, from about 2 µg to about 5 µg, from about 4 µg to about 10 µg, or from about 2 µg to about 4 µg per g of the subject.

The present invention will be further understood by reference to the following non-limiting examples.

EXAMPLES

Example 1. Structure and Properties of Exemplary GnRH Nanoparticles

Material and Methods
Preparation of GnRh Nanoparticles

There are four major steps in the preparation of GnRH nanoparticles [BUS-PEG-(CF647-SAP@ZIF)]. They are as follows: (1) conjugation of CF647-SAP; (2) conjugation of BUS-PEG-FA; (3) synthesis of CF647-SAP@ZIF; (4) prepare BUS-PEG-(CF647-SAP@ZIF).

(1) Conjugation of the Dye CF647 with Saporin (SAP)

The conjugation of CF647-SAP was accomplished by dissolving 1 mg SAP in 1 mL of 0.1 M sodium bicarbonate buffer (pH 8.3) and 52.4 µl 10 mM CF647 succinimidyl ester dyes in DMSO to react for 1 hour at room temperature. The purified conjugation of CF647-SAP was obtained by using ultrafiltration devices (Amicon Ultra-2 Centrifugal Filter Unit) and the concentration was characterized by UV-Vis absorbance spectrometer (Shimadzu UV-2450).

(2) Conjugation of Buserelin (BUS) to PEG-FA

The conjugation of BUS-PEG-FA was obtained by reacting 10 mg BUS and 50 mg FA-PEG-NHS in PBS buffer (pH=7.4) for 1 h. The conjugation of BUS-PEG-FA was purified by ultrafiltration devices (Amico Ultra-15 Centrifugal Filter Unit), and then freeze-dried under vacuum.

(3) Synthesis of CF647-SAP@ZIF

CF647-SAP@ZIF nanoparticles were synthesized via rapid pouring 0.5875 g Zinc nitrate hexahydrates (in 4 g water) into an aqueous solution containing 11.35 g 2-methylimidazole, 722 µg CF647-SAP and 40 g water to form CF647-SAP@ZIF nanoparticles 30 min after the reaction at room temperature. The product was washed and collected by centrifugation.

(4) Preparation of BUS-PEG-(CF647-SAP@ZIF)

100 mg of the as-synthesized CF646-SAP@ZIF nanoparticles was dispersed in 10 mg/mL BUS-PEG-FA water solution, and then stirred for 48 h under room temperature. Then the BUS-PEG-(CF647-SAP@ZIF) product was collected by centrifugation, and then freeze-dried under vacuum for long-term storage.

The resulting BUS-PEG-modified ZIF nanoparticles containing the dye CF647 and active agent, saporin, encapsulated therein are referred to in the Examples as "GnRH nanoparticles" or "GnRH NPs".

Morphology and Fluorescence of GnRH Nanoparticles

The size of the nanoparticles was determined using scanning electron microscopy. The morphology of the ZIF NPs was assessed using a field emission gun scanning electron microscope (FEG-SEM, FEI Inspect F). Fluorescent properties of ZIF, ZIF with CF647 and saporin encapsulated therein, and BUS-PEG-modified ZIF with CF647 and SAP encapsulated therein ("GnRH NP") were analyzed using a Horiba FluoroLog-3 spectrofluorometer (Horiba Scientific, Edison, N.J., USA) equipped with a 450-W xenon arc lamp, a photomultiplier tube (measurement range, 240-850 nm).

Purity of GnRH NPs

Core bulk samples prepared for X-ray diffraction (XRD) were air-dried and powdered for random particle orientation and mounting as a pressed powder. Sample was ground briefly with mortar and pestle. XRD patterns were collected using a Bruker D8 Advance diffractometer. Instrument conditions included using CoKα radiation (generated at 35 kV and 40 mA), 217.5 mm goniometer radius, 0.6 mm primary slit, Fe-filter, and a Lynx-Eye position sensitive solid-state detector. XRD scan parameters were run at 0.3 s/step in 0.01 °2θ step increments. Data was processed using Bruker Eva software, which includes background correction, Kα2 stripping and peak d-spacing and intensity assignments. The peak file generated from the peak search was compared to the International Center for Diffraction Data (ICDD) Powder Diffraction File (PDF-4+2018).

Results

Figure 1B:
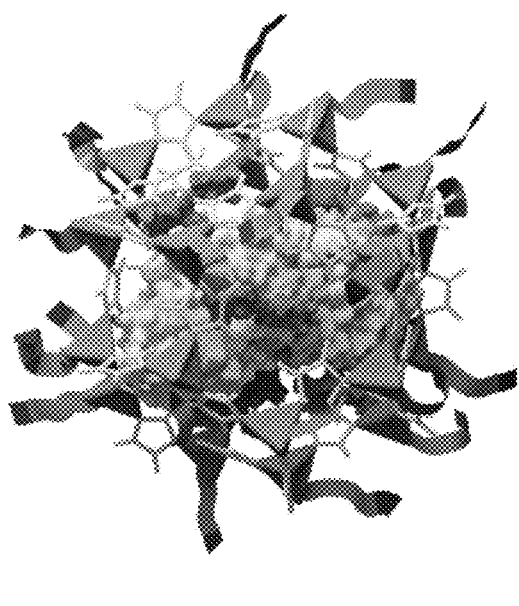
FIG. 1B is a schematic of the structure of an exemplary nanoparticle that contains a zeolitic imidazolate framework ("ZIF") cage, folic acid ("FA") conjugated PEG, FA and Buserelin ("BUS") conjugated PEG, saporin ("SAP"), and CF647.
Figure 1C:
FIG. 1C is a schematic of the structure of an exemplary nanoparticle that contains a ZIF cage, FA and Buserelin ("BUS") conjugated PEG, and saporin ("SAP").

FIG. 1A shows the components of the exemplary organic nanoparticle before assembling. As shown in FIG. 1A, each organic nanoparticle contains a ZIF cage made from $Zn^{2+}$ and imidazole, folic acid ("FA") conjugated PEG, FA and buserelin ("BUS") conjugated PEG, an active agent (i.e. saporin), and optionally dye molecules (i.e. CF647). FIG. 1B shows the structure of an assembled GnRH nanoparticle. FIG. 1C shows the structure of an assembled GnRH nanoparticle that does not include a dye molecule. As shown in FIG. 1B, the surface of the ZIF cage is tagged with Buserelin, a drug that acts as a GnRH agonist. Buserelin binds to receptors that are present on gonadotrophs in the pituitary. Saporin, which is a ribosome inactivating protein, and CF647 are encapsulated in the core of the organic nanoparticle. FIGS. 1A and 1B are schematics of the different components in each organic nanoparticle (the components are not shown to scale).

Figure 2:
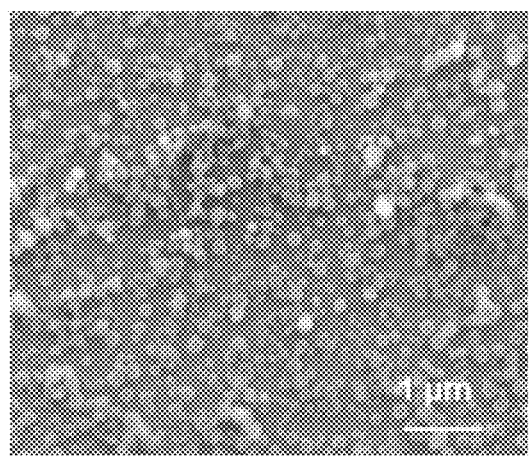
FIG. 2 shows a scanning electron microscope ("SEM") image of exemplary GnRH NPs.
Figure 3A:
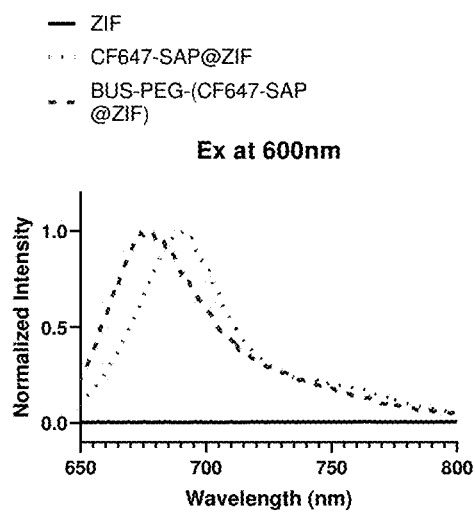
FIGS. 3A-3B are graphs showing the fluorescent property of three types of nanoparticles: ZIF, ZIF with CF647 and SAP encapsulated therein, and GnRH NPs, analyzed using a Horiba FluoroLog-3 spectrofluorometer (Horiba Scientific, Edison, N.J., USA) equipped with a 450-W xenon arc lamp, a photomultiplier tube (measurement range, 240-850 nm).
Figure 3B:
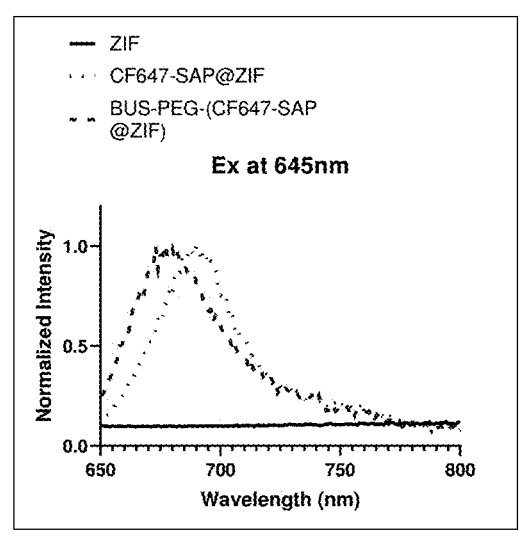
Figure 4:
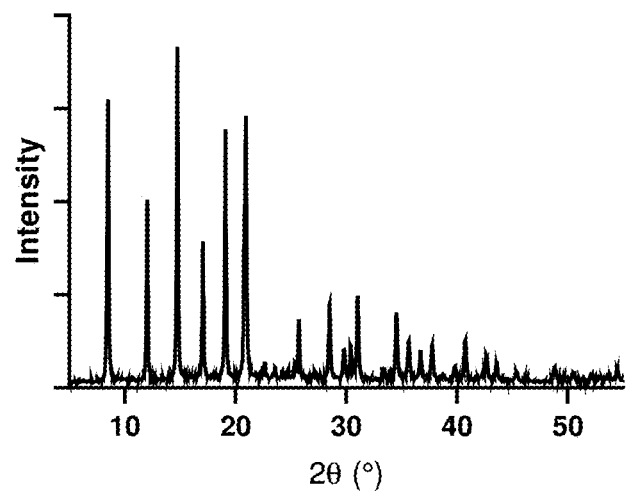
FIG. 4 is a graph showing X-ray diffraction analysis of GnRH nanoparticles (NPs). The peak file generated from the peak search was compared to the International Center for Diffraction Data (ICDD) powder diffraction file. The patterns match with PDF #00-066-0916 as ZIF-90 (91% match).

As shown in FIG. 2, the sizes of GnRH nanoparticles are between 60 nm and 130 nm (including PEG). As shown in FIGS. 3A and 3B, the GnRH nanoparticles emit light (shown in dashed lines) with a maximum intensity at about 665 nm when excited at two different wavelengths, i.e. 600 nm (FIG. 3A) and 645 nm (FIG. 3B), demonstrating the formation of the nanoparticles. Additionally, as shown in FIG. 4, XRD analysis of the GnRH nanoparticles shows that the patterns are 91% matches to PDF #00-066-0916 as ZIF-90 crystal structure.

Example 2. The GnRH Nanoparticles Inhibit Pituitary Cell Viability

Materials and Methods

Figure 5:
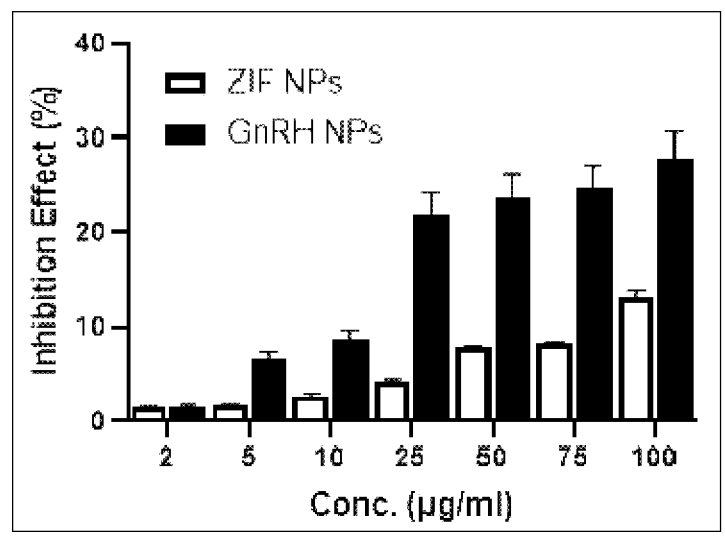
FIG. 5 is a bar graph showing the inhibition effect (%) of RC4B/C pituitary cells by unconjugated ZIF NPs or GnRH NPs at varied concentrations.

Solutions of GnRH nanoparticles in PBS were tested in RC4B/C pituitary cells. Pituitary cells were plated into a 96-well plate at the density of $3\times10^5$ cells/cm$^2$ and cultured in vitro in complete medium under standard conditions (i.e. 37° C., 5% $CO_2$, 95% humidity) for 3 days. They were exposed to varying concentrations of the GnRH nanoparticles or an unconjugated ZIF nanoparticle for 1 hour, and then medium was refreshed (to remove the nanoparticles) and the cells were in culture for the following 3 days before being used in the MTT assay. The unconjugated ZIF nanoparticle contains all the elements of the GnRH nanoparticles expect for BUS. The concentrations of each nanoparticle-containing solution were 2, 5, 10, 25, 50, 75, and 100

µg/mL. At the end of this period, the cells were subjected to an MTT assay (Cat No. 30-1010K, ATCC) to measure cell viability.
Results Solutions containing 25 µg/ml or more of the GnRH nanoparticles, resulted in 23-28% inhibition of growth of RC4B/C pituitary cells, demonstrating that the GnRH nanoparticles affect about 25% of the cell population that accounts for FSH and LH producing cells (FIG. 5).

Example 3. The GnRH Nanoparticles Block Estrous Cycles and Inhibit Follicles Development and Ovulation in Rats Material and Methods
Short-Term and Long-Term Nanoparticle Tissue Accumulation Seven adult female Holtzman Sprague Dawley rats were injected intravenously with phosphate buffered saline (PBS)-control and eight adult female Holtzman Sprague Dawley rats were injected intravenously with a solution of GnRH nanoparticles in PBS (1 µg/g body weight). The rats were sacrificed 3 hours or 3 weeks later; and their organs were harvested and subjected to imaging using IVIS.
Nanoparticles in the Pituitary Female Holtzman Sprague Dawley rats were injected intravenously with a solution of GnRH nanoparticles in PBS at a rate of 1 µg/g body weight (low dose) or phosphate buffered saline ("PBS", control). Three hours later, they were sacrificed. The brain, pituitary, adrenals, liver, kidneys, lungs, and spleen were removed, fixed in formalin, and made into paraffin blocks. Sections were examined under a confocal microscope to determine localization of the nanoparticles.

To confirm the binding of the nanoparticles to the gonadotrophs in pituitary, pituitaries from animals that were injected with the GnRH nanoparticle solutions or PBS as described above were sacrificed 3 hours after administration. Sections of pituitary were treated with antibody for LH to show the location of gonadotrophs. They were examined under a confocal microscope.
Estrous Cyclicity Vaginal cytology was performed to determine the estrous cyclicity of rats. Those animals that showed regular 4-5 day estrous cycles were then injected with the GnRH nanoparticle solutions intravenously at either 2 µg/g BW (low dose) or 3 µg/g BW (high dose). Controls received an injection of PBS. Animals were allowed to recover for 3 days, after which their estrous cyclicity was monitored again for 3 weeks.
Results Images of the organs of rats from the control group and treated GnRH NP-treated group were review. IVIS imaging of tissues from animals injected with GnRH nanoparticles and sacrificed 3 hours following injection showed the presence of the nanoparticles in the brain and pituitary, which are rich in GnRH receptors (data not shown). The GnRH nanoparticles were also seen in liver and kidney, where the nanoparticles are metabolized and cleared, respectively (data not shown). No nanoparticles associated fluorescence was observed in the heart and the spleen. In contrast, no fluorescence was detected in any tissue in PBS-treated animals. When animals were sacrificed 3 weeks following injection of GnRH NP, the nanoparticles were not seen in any of the organs, demonstrating that the particles were completely cleared out of the system (data not shown).

Confocal images of sections of the pituitary from animals injected intravenously with the GnRH nanoparticle solutions or PBS show that the nanoparticles are localized to specific cell populations in the pituitary of the rat (data not shown). To confirm that the GnRH nanoparticles specifically binds to the gonadotrophs in pituitary, sections of pituitary were treated with antibody for LH to localize gonadotrophs. The confocal images of LH-stained gonadotrophs of the pituitary showed green fluorescence (data not shown). The confocal images of the GnRH nanoparticles showed red fluorescence (data not shown). The yellow fluorescence observed in the merged images of labeled gonadotrophs and GnRH nanoparticles demonstrated that location of the nanoparticles was in the LH-stained gonadotrophs (data not shown).

Exfoliative vaginal cytology provides a clear indication of estrous cycles (reproductive cycles) in rodents. In general, young female rats exhibit 4-5 day estrous cycles. The stages of estrous cycles in rats are as follows: Proestrus ("PE"), Estrous ("E"), Diestrus I ("DI"), and metestrus or diestrus II ("DII"). Rats that have normal reproductive function will exhibit these stages regularly, i.e. every 4-5-day intervals. Ovulation occurs on the afternoon of proestrus due to the surge in luteinizing hormone (LH), which are produced by gonadotrophs. The GnRH nanoparticles can kill the LH producing gonadotrophs, and thus the preovulatory LH surge is prevented. This results in cessation of estrous cycle. Thus, monitoring estrous cycles in rats provides a way of assessing reproductive function.

Figure 6A:
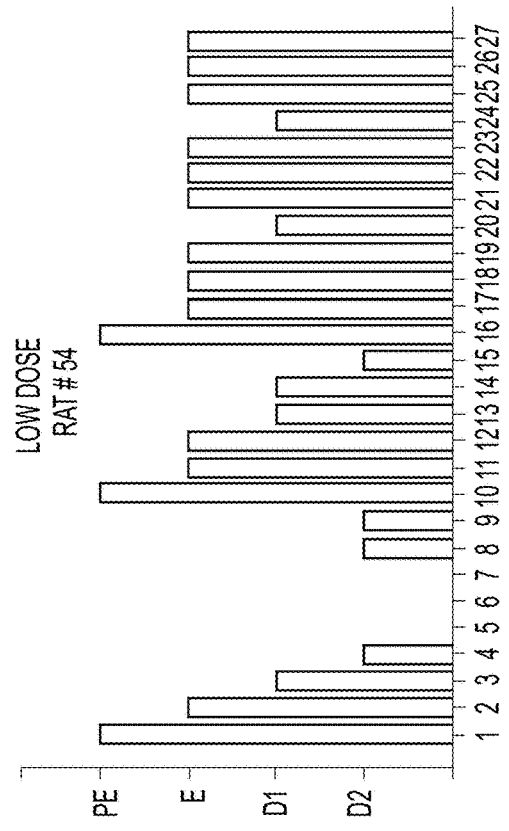
FIGS. 6A-6D are bar graphs showing estrous cyclicity of rats intravenously injected with PBS (FIG. 6A), low dose (i.e. about 2 μg/g body weight) of GnRH NPs (FIG. 6B and FIG. 6C), and high dose (i.e. about 3 μg/g body weight) of GnRH NPs (FIG. 6D), respectively. The y-axis represents the different stages of the estrous cycle; listed in order, Proestrous (PE), estrous (E), diestrous (DI), and metestrous (D2). The x-axis represents the number of days after monitoring starts.
Figure 6B:
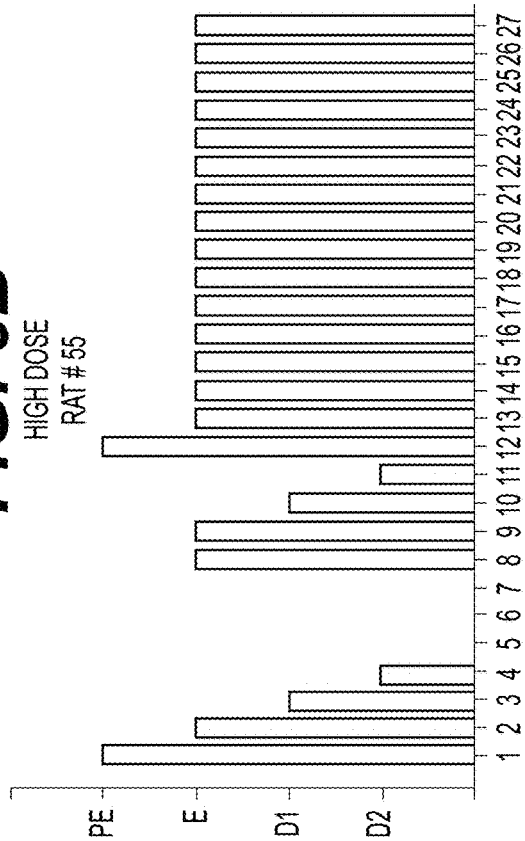
Figure 6C:
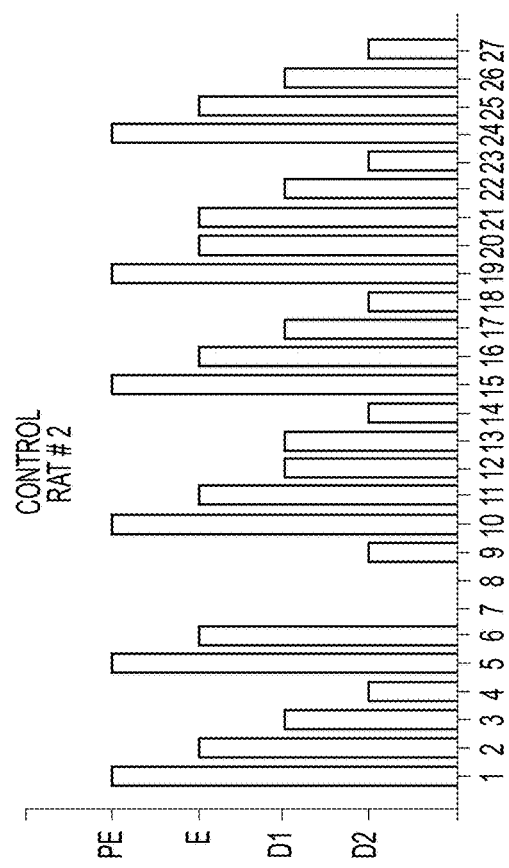
Figure 6D:
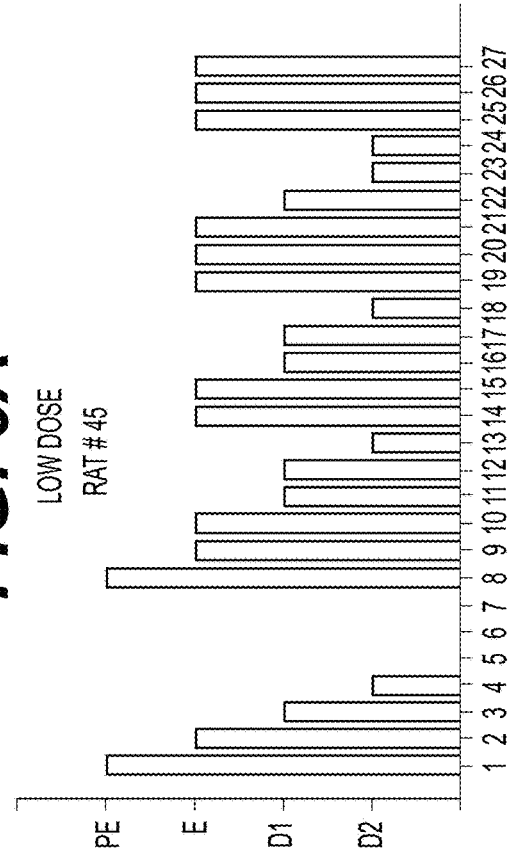

As shown in FIG. 6A, control rats have regular cycles throughout the period of observation. Estrous cycles are inhibited in both low dose and high dose groups. The effect is variable in the low dose group (FIGS. 6B and 6C). When rats do not have normal hormonal input from the pituitary (i.e., production of LH as mentioned above), they enter a state of constant estrous, which is apparent in the rat treated with the higher dose of the GnRH nanoparticles (FIG. 6D). The control rat continued to have regular estrous cycles after injection with PBS. These results show that the GnRH nanoparticles are effective in suppressing estrous cycles in rats.

Figure 7A:
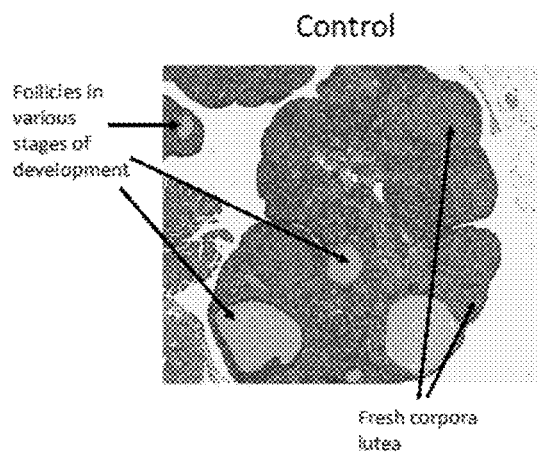
FIGS. 7A-7B are images (3× magnification) of the ovaries of a control rat (FIG. 7A) and a treated rat (FIG. 7B), respectively. The images were taken 3 weeks following treatment.
Figure 7B:
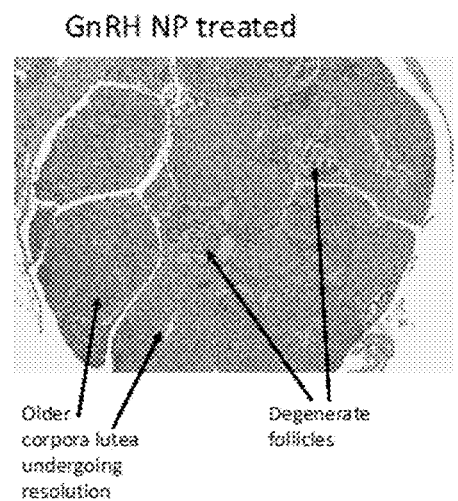

The ovaries of these animals after sacrifice were also analyzed. FIGS. 7A and 7B show images (3× magnification) of the ovaries of a representative animal in the control (FIG. 7A) and GnRH NP-treated group (FIG. 7B), 3 weeks following injection. The image of the ovary of the control animal shows follicles in various stages of development and the presence of fresh corpora lutea. The image of the ovary of the GnRH NP-treated animal has degenerating follicles and no developing follicles due to the lack of luteinizing hormone ("LH")/follicle stimulating hormone ("FSH") from the pituitary. Corpora lutea are undergoing resolution marked by invasion of macrophages and fibrosis.

Example 4. The GnRH Nanoparticles Decrease Circulating Estrogen Levels and Induce Degeneration of Follicles in Cat Ovaries, and Induce Degenerative Changes in the Testis of Male Cats Materials and Methods Ten female and ten male adult cats were used in the study. Of these, five females and five males were randomly assigned to the control group and the other five to the GnRH nanoparticle treatment group. Control animals were injected with saline and subjected to surgical gonadectomy (ovariectomy in the case of females and castration in the case of males). The treatment group received the GnRH nanoparticle intravenously at a dose of 2.5 mg/kg body weight. Blood samples were collected prior to surgery or nanoparticle administration. After a month, another blood sample was collected from both groups. The nanoparticle-treated group was then subjected to ovariectomy or castration to determine the effects of nanoparticle treatment on the gonads. Estrogen levels in female cats were determined using an estradiol ELISA.

Figures 8A, 8B:
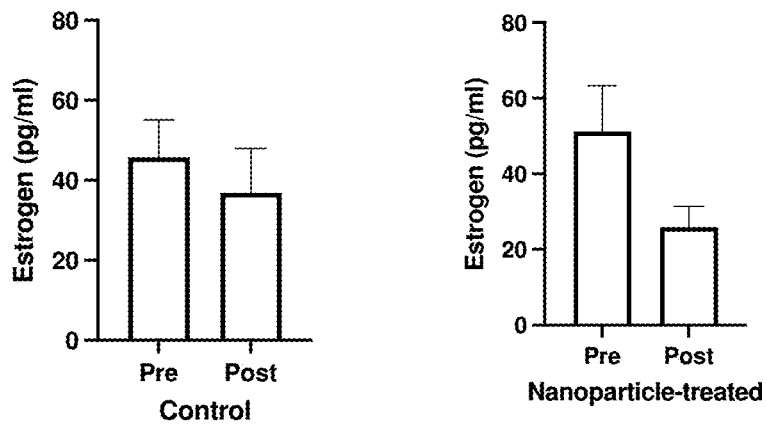
FIGS. 8A-8B are bar graphs showing the circulating levels of estrogen in female cats that were subjected to ovariectomy (control) (FIG. 8A) and nanoparticle injection (2.5 mg/kg BW; treatment group) (FIG. 8B) respectively. Estrogen levels were measured at the time of physical ovariectomy or nanoparticle injection ("Pre"). Estrogen levels were also measured one month later ("Post").

Results:

The circulating levels of estrogen in female cats that were subjected to ovariectomy (control) and nanoparticle injection (2.5 mg/kg body weight; treatment group) are shown in FIGS. 8A and 8B respectively. Estrogen levels were measured at the time of physical ovariectomy or nanoparticle treatment ("Pre"). Estrogen levels were also measured one month after treatment ("Post"). FIG. 8A demonstrates that spaying control females produced only a modest decrease in estrogen levels. In contrast, FIG. 8B demonstrates that nanoparticle-treated animals had a significant reduction in estrogen levels (* indicates p<0.05).

Figure 9A:
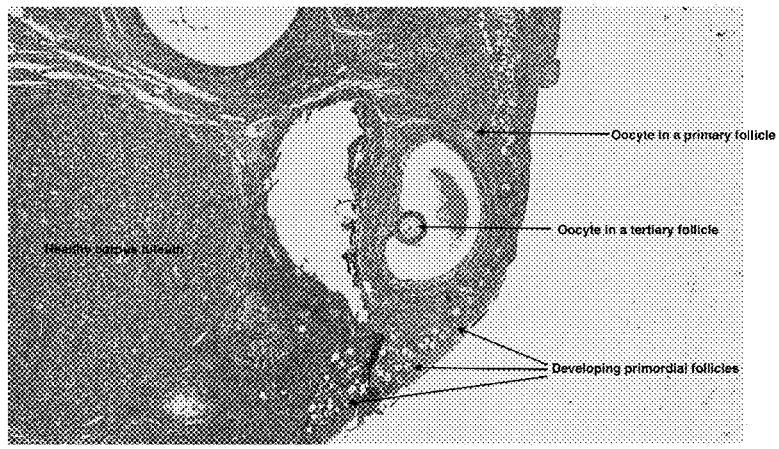
FIGS. 9A-9B are representative images (6× magnification) showing a section of the ovaries of a control female cat (FIG. 9A) and a section of the ovaries of a nanoparticle-treated cat (FIG. 9B). The ovary from the nanoparticle-treated cat was obtained one month after treatment.
Figure 9B:
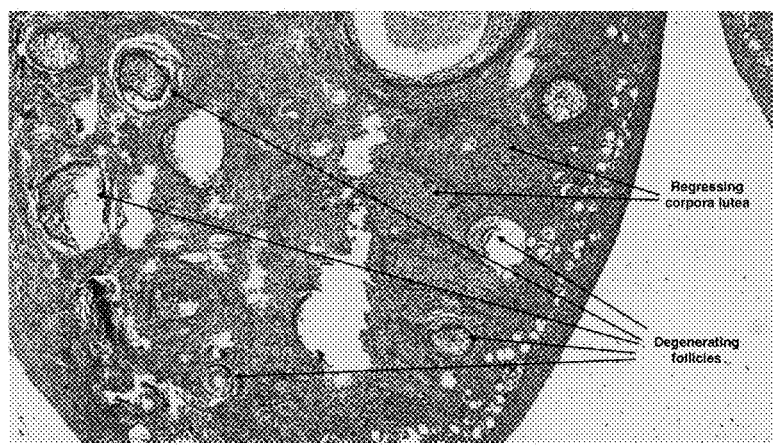

Representative images of ovaries of a control female cat and a nanoparticle-treated cat are shown in FIGS. 9A and 9B respectively. The ovary from the nanoparticle-treated cat was obtained a month after treatment. Histological sections of the ovaries (6× magnification) revealed healthy follicles of all stages and corpora lutea in the control cats (FIG. 9A). In contrast, the ovaries from the nanoparticle-treated cats (6× magnification) had degenerate follicles and regressing corpora lutea (FIG. 9B).

Figure 10A:
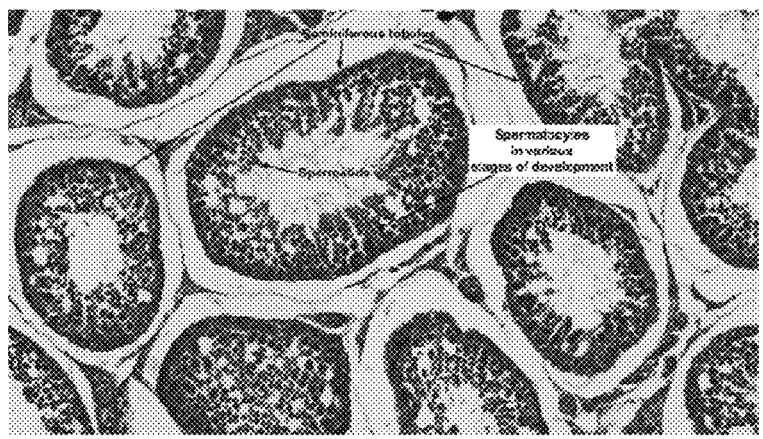
FIGS. 10A-10B are representative images (25× magnification) showing a section of the testis from a control male cat (FIG. 10A) and a section of the testis from a nanoparticle-treated male cat (FIG. 10B). The testis from the nanoparticle-treated cat was obtained one month after treatment.
Figure 10B:
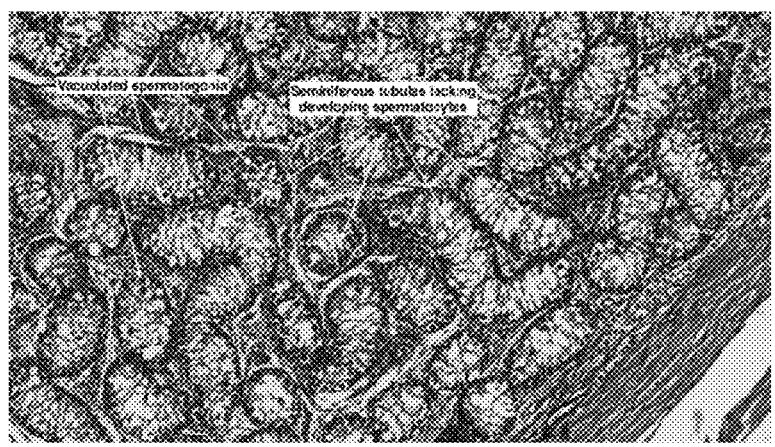

Further, representative images of testes from a control male cat and a nanoparticle-treated male cat are shown in FIGS. 10A and 10B respectively. The testis from the nanoparticle-treated cat was obtained one month after treatment. The testes from control cats (25× magnification) had healthy seminiferous tubules containing intact spermatogonia and spermatocytes in various stages of development with developing spermatids (FIG. 10A). In contrast, the testes from nanoparticle-treated cats (25× magnification) had degenerate seminiferous tubules with spermatogonia that appeared vacuolated and lacked spermatocytes and spermatids (FIG. 10B).

The lack of LH/FSH following administration of the GnRH nanoparticles results in cessation of estrous cycles and follicles and degeneration of follicles and older corpora lutea undergoing resolution. In contrast, control animals have developing follicles at different stages as well as healthy corpora lutea.

The results described above demonstrate that the GnRH nanoparticles are effective in blocking estrous cycles and inhibiting development of follicles and ovulation in female rats and causing degenerative changes in the ovaries in testes in cats without any untoward side effects. Thus, the nanoparticles described herein and formulations thereof are effective tools for non-surgical sterilization.

We claim:

1. A plurality of nanoparticles for sterilization, wherein the nanoparticles comprise
a cage,
a surface modifying agent,
a targeting ligand, and
an active agent,
wherein the cage is a zeolitic imidazolate framework ("ZIF"),
wherein the surface modifying agent comprises a polymer backbone,
wherein the targeting ligand is a gonadotropin-releasing hormone ("GnRH") receptor agonist, a follicle stimulating hormone ("FSH") receptor agonist, or a luteinizing hormone ("LH") receptor agonist, or a combination thereof,
wherein the active agent is a ribosome inactivating protein, an apoptosis inducer, a hormone, a receptor ligand, or a nucleic acid, or a combination thereof,
wherein the surface modifying agent is attached to an outer surface of the cage, wherein the targeting ligand is conjugated to the surface modifying agent, wherein the targeting ligand is exposed to a surrounding environment, and
wherein the active agent is encapsulated in the cage.

2. The plurality of nanoparticles of claim 1, wherein the ZIF comprises a metal ion selected from the group consisting of $Zn^+$, $Zn^{2+}$, $Pd^{2+}$, $Pd^{4+}$, $Pt^{2+}$, $Pt^{4+}$, $Ni^+$, $Ni^{2+}$, $Ni^{3+}$, $Mn^{2+}$, $Mn^{3+}$, $Mn^{4+}$, $Mn^{6+}$, $Mn^{7+}$, $Co^{2+}$, $Co^{3+}$, $Cu^{2+}$, $Cd^{2+}$, $Fe^{2+}$, $Fe^{3+}$, and $Ti^{4+}$.

3. The plurality of nanoparticles of claim 1, wherein the ZIF comprises imidazolate functionalized with amine, hydroxyl, thiol, aldehyde, or carboxyl, or a combination thereof.

4. The plurality of nanoparticles of claim 1, wherein the ZIF is ZIF-2, ZIF-3, ZIF-4, ZIF-8, ZIF-10, ZIF-11, ZIF-12, ZIF-14, ZIF-20, ZIF-21, ZIF-60, ZIF-61, ZIF-62, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-81, ZIF-82, ZIF-90, ZIF-91, ZIF-92, ZIF-95, or ZIF-100.

5. The plurality of nanoparticles of claim 1, wherein at least 20 wt % (weight of the surface modifying agent conjugated to the targeting ligand/total weight of the surface modifying agent attached to the ZIF), at least 25 wt %, at least 30 wt %, at least 35 wt %, at least 40 wt %, at least 45 wt %, at least 50 wt %, at least 55 wt %, at least 60 wt %, at least 65 wt %, at least 70 wt %, at least 75 wt %, at least 80 wt %, at least 85 wt %, at least 90 wt %, at least 95 wt %, in a range from 20 wt % to 100 wt %, from 30 wt % to 100 wt %, or from 40 wt % to 100 wt % of the surface modifying agent is conjugated to the targeting ligand.

6. The plurality of nanoparticles of claim 1, wherein the end of the surface modifying agent that is attached to the ZIF comprises a chemical moiety containing one or more negative charges.

7. The plurality of nanoparticles of claim 6, wherein the chemical moiety is folate, L-methylfolate, or glutamate, or a combination thereof.

8. The plurality of nanoparticles of claim 1, wherein the polymer backbone is selected from the group consisting of polyalkylene glycol, polylactic acid, polyglycolic acid, poly(lactic-co-glycolic acid), polyanhydrides, poly(ortho)esters, polyurethanes, poly(butyric acid), poly(valeric acid), poly(lactide-coaprolactone), and polyethylenimine, and a copolymer thereof.

9. The plurality of nanoparticles of claim 1, wherein the polymer backbone of the surface modifying agent is polyethylene glycol.

10. The plurality of nanoparticles of claim 1, wherein the polymer backbone has a molecular weight in a range from about 1 kDa to about 10 kDa, from about 2 kDa to about 10 kDa, from about 3 kDa to about 10 kDa, from about 4 kDa to about 10 kDa, from about 1 kDa to about 9 kDa, from about 2 kDa to about 9 kDa, from about 3 kDa to about 9 kDa, from about 4 kDa to about 9 kDa, from about 1 kDa to about 8 kDa, from about 2 kDa to about 8 kDa, from about 3 kDa to about 8 kDa, from about 4 kDa to about 8 kDa, from about 1 kDa to about 7 kDa, from about 2 kDa to about 7 kDa, from about 3 kDa to about 7 kDa, from about 4 kDa to about 7 kDa, from about 1 kDa to about 6 kDa, from about 2 kDa to about 6 kDa, from about 3 kDa to about 6 kDa, or from about 4 kDa to about 6 kDa.

11. The plurality of nanoparticles of claim 1, having an average diameter in a range from about 10 nm to about 100 nm, from about 10 nm to about 90 nm, from about 10 nm to about 80 nm, from about 20 nm to about 100 nm, from about 20 nm to about 90 nm, from about 20 nm to about 80 nm, from about 30 nm to about 100 nm, from about 30 nm to about 90 nm, or from about 30 nm to about 80 nm.

12. The plurality of nanoparticles of claim 1, wherein the surface density of the surface modifying agent ("SMA") on the surface of the nanoparticle is at least 1 SMA/nm$^2$, at least 5 SMA/nm$^2$, at least 7 SMA/nm$^2$, at least 10 SMA/nm$^2$, at least 15 SMA/nm$^2$, at least 20 SMA/nm$^2$, at least 25 SMA/nm$^2$, at least 30 SMA/nm$^2$, at least 35 SMA/nm$^2$, at least 40 SMA/nm$^2$, at least 45 SMA/nm$^2$, or at least 50 SMA/nm$^2$.

13. A pharmaceutical formulation comprising
the plurality of nanoparticles of claim 1, and
a pharmaceutically acceptable carrier and/or excipient.

14. The pharmaceutical formulation of claim 13, wherein the pharmaceutical formulation comprises an effective amount of the nanoparticles to decrease the level of the gonadal hormone in the blood of the subject by at least 30%, at least 35%, at least 40%, at least 45%, or at least 50% compared to the level of the gonadal hormone in the blood of a control subject at the same stage of menstrual cycle; and/or to induce the degeneration of seminiferous tubules in a subject, optionally wherein the effective amount of the nanoparticles is effective to degenerate seminiferous tubules of the subject by at least 80%, at least 85%, at least 90%, at least 95%, or up to 100% compared to seminiferous tubules of a control subject as shown by imaging.

15. The pharmaceutical formulation of claim 13, wherein the pharmaceutical formulation is in a form suitable for oral administration, intramuscular administration, intravenous administration, intraperitoneal administration, or subcutaneous administration, or a combination thereof.

16. A method for sterilizing a subject in need thereof comprising
(i) administering to the subject the pharmaceutical formulation of claim 13, wherein step (i) occurs one or more times.

17. The pharmaceutical formulation of claim 13, wherein the pharmaceutical formulation comprises an effective amount of the nanoparticles to decrease the level of a gonadal hormone in the blood; to induce degeneration of ovarian follicles; and/or to terminate estrous cycle, of a subject.

18. The pharmaceutical formulation of claim 17, wherein the effective amount of the nanoparticles is effective to decrease the level of the gonadal hormone in the blood of the subject by at least 30%, at least 35%, at least 40%, at least 45%, or at least 50% compared to the level of the gonadal hormone in the blood of a control subject at the same stage of estrous cycle; to degenerate ovarian follicles of the subject by at least 80%, at least 85%, at least 90%, at least 95%, or up to 100% compared to ovarian follicles of a control subject at the same stage of estrous cycle as shown by imaging; and/or to terminate estrous cycle in the subject as shown by a state of constant estrous stage.

* * * * *